(12) United States Patent
Vazquez et al.

(10) Patent No.: US 9,516,018 B1
(45) Date of Patent: Dec. 6, 2016

(54) CREDENTIAL TECHNOLOGY

(71) Applicant: MicroStrategy Incorporated, Vienna, VA (US)

(72) Inventors: Hector Vazquez, Ashburn, VA (US); Gang Chen, Vienna, VA (US); Sergey Mironenko, Ellicott City, MD (US); Gary Gabriel, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 14/209,101

(22) Filed: Mar. 13, 2014

Related U.S. Application Data

(60) Provisional application No. 61/789,428, filed on Mar. 15, 2013.

(51) Int. Cl.
*H04L 29/06* (2006.01)

(52) U.S. Cl.
CPC .................................. *H04L 63/0853* (2013.01)

(58) Field of Classification Search
CPC .................................................... H04L 63/0853
See application file for complete search history.

(56) References Cited

U.S. PATENT DOCUMENTS

| | | | |
|---|---|---|---|
| 6,606,663 B1 * | 8/2003 | Liao et al. ..................... 709/229 |
| 7,676,829 B1 * | 3/2010 | Gui et al. ......................... 726/5 |
| 8,181,236 B2 * | 5/2012 | Banerjee et al. ................ 726/10 |
| 8,935,769 B2 * | 1/2015 | Hessler ............... H04L 63/0869 713/171 |
| 2004/0098581 A1 * | 5/2004 | Balfanz et al. ................ 713/155 |
| 2004/0107366 A1 * | 6/2004 | Balfanz et al. ................ 713/201 |
| 2006/0165060 A1 * | 7/2006 | Dua .............................. 370/352 |
| 2009/0249478 A1 * | 10/2009 | Rosener et al. ................ 726/19 |
| 2011/0302641 A1 * | 12/2011 | Hald ....................... G06F 21/43 726/7 |
| 2014/0096215 A1 * | 4/2014 | Hessler ............... H04L 63/0869 726/7 |
| 2014/0189808 A1 * | 7/2014 | Mahaffey et al. ................. 726/4 |
| 2014/0282993 A1 * | 9/2014 | Van Till et al. .................. 726/9 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

(Continued)

*Primary Examiner* — Mahfuzur Rahman
(74) *Attorney, Agent, or Firm* — Fish & Richardson P.C.

(57) ABSTRACT

In one implementation, a server system receives, from a device of a user, a request to validate a credential of a second user. The server system identifies the credential of the second user to validate based on the request received from the device of the first user. The server system confirms that the credential of the second user corresponds to a credential issued to the second user by a credential issuing organization. The server system accesses the credential information for the credential of the second user and validates the credential of the second user to the first user.

15 Claims, 16 Drawing Sheets

(56) References Cited

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

| Group Name 1002 | User Name 1004 | Title of Credential 1006 | Expiration Date 1008 | Cache until Date 1010 | Extra Field 1012 |
|---|---|---|---|---|---|
| Fitness Club | April Ford | Gym Membership | 2/3/25 | 01/12/15 | 1014 |
| City Metro System | Henry Clarke | Metro Rail Pass | 5/4/15 | 12:00 am | 1016 |
| Stanford University | Sara John | PhD History | 05/08/20 | 05/08/20 | 1018 |

CREDENTIAL TECHNOLOGY

CROSS-REFERENCE TO RELATED APPLICATION

This application claims priority from U.S. Provisional Application No. 61/789,428, filed Mar. 15, 2013, and titled "Credential Technology," which is incorporated by reference.

TECHNICAL FIELD

This disclosure relates to credential technology.

BACKGROUND

Private and public organizations issue credentials to persons, for example, to signify completion of a set of requirements, membership in a particular group, permissions and/or authorizations that have been conferred to such persons, etc. Persons may use the credentials to verify completion of the set of requirements, membership in the particular group, possession of such permissions and/or authorizations, etc.

SUMMARY

In one aspect, a method includes receiving, at a server system and from a device of a first user, a request to validate a credential of a second user and identifying, by the server system, the credential of the second user to validate based on the request received from the device of the first user. The method also includes confirming, at the server system, that the credential of the second user corresponds to a credential issued to the second user by a credential issuing organization and, based on confirmation that the credential of the second user corresponds to a credential issued to the second user by the credential issuing organization, accessing, by the server system and for the credential of the second user, credential information provided by the credential issuing organization. The method further includes validating, to the first user, the credential of the second user based on the accessed credential information provided by the credential issuing organization.

Implementations may include one or more of the following features. For example, the method may include, prior to the request to validate the credential of the second user, receiving, from the credential issuing organization, credential information that defines the credential of the second user and caching, in electronic storage of the server system, the received credential information in association with cache until data that defines how long the cached credential information is valid. In this example, the method may include determining that, at the time of the request to validate the credential of the second user, the cached credential information is valid based on the cache until data and accessing the cached credential information. Further, in this example, the method may include validating, to the first user, the credential using the cached credential information and sending at least a portion of the cached credential information to the first user.

In some implementations, the method may include, prior to the request to validate the credential of the second user, receiving, from the credential issuing organization, credential information that defines the credential of the second user and caching, in electronic storage of the server system, the received credential information in association with cache until data that defines how long the cached credential information is valid. In these implementations, the method may include determining that, at the time of the request to validate the credential of the second user, the cached credential information is not valid based on the cache until data and, based on the determination that the cached credential information is not valid, sending, to the credential issuing organization, a request for updated credential information for the credential of the second user. Further, in these implementations, the method may include receiving, from the credential issuing organization, updated credential information for the credential of the second user and validating, to the first user, the credential using the updated credential information received from the credential issuing organization and sending at least a portion of the updated credential information to the first user.

In some examples, the method may include accessing, by the server system, a user access token associated with the credential of the second user. The user access token may have been stored at the server system prior to the request to validate the credential of the second user based on the credential being added to an account of the second user. In these examples, the method may include providing, by the server system and using communication information established between the server system and the credential issuing organization, the accessed user access token. The accessed user access token may be provided with the request for updated credential information and may be used by the credential issuing organization to verify the request. Further, in these examples, the method may include receiving, from the credential issuing organization, updated credential information stored at the credential issuing organization in association with the user access token.

In some implementations, the method may include accessing, by the server system, a user access token associated with the credential of the second user. The user access token may have been stored at the server system prior to the request to validate the credential of the second user based on the credential being added to an account of the second user. In these implementations, the method may include sending, to the credential issuing organization, a request for updated credential information for the credential of the second user and providing, by the server system and using communication information established between the server system and the credential issuing organization, the accessed user access token with a request for updated credential information for the credential of the second user. The accessed user access token may be used by the credential issuing organization to verify the request. Also, in these implementations, the method may include receiving, from the credential issuing organization, updated credential information for the credential of the second user. The updated credential information may be stored at the credential issuing organization in association with the user access token. Further, in these implementations, the method may include validating, to the first user, the credential using the updated credential information received from the credential issuing organization and sending at least a portion of the updated credential information to the first user.

In addition, the method may include receiving, at the server system and from the device of the first user, a code for the credential of the second user and confirming that the code corresponds to a credential issued to the second user by the credential issuing organization. The method may include receiving, at the server system and from the device of the first user, a code that was transmitted from a device of the second user to the device of the first user using ultrasonic communication. The method also may include receiving, at the server system and from the device of the first user, a code that was extracted by the device of the first user from a quick reference (QR) code displayed by a device of the second user and imaged by the device of the first user.

In some examples, the method may include receiving, at the server system and from a device of the second user, a request for a code to use in validating a credential of the second user and generating, by the server system, an alphanumeric code associated with the credential of the second user to be validated. In these examples, the method may include storing the generated alphanumeric code in association with timing data that defines how long the generated alphanumeric code is valid and sending, to the device of the second user, the generated alphanumeric code. Further, in these examples, the method may include receiving, at the server system and from the device of the first user, an alphanumeric code that was received by the device of the first user based on user input and determining that the received alphanumeric code matches the generated alphanumeric code and that reception of the received alphanumeric code accords with the timing data that defines how long the generated alphanumeric code is valid.

The method may include maintaining, by the server system, accounts for multiple, different users with credentials issued by multiple, different organizations. Also, the method may include transmitting the accessed credential information to the device of the first user in a manner that enables the device of the first user to display the accessed credential information. Further, the method may include transmitting, to the device of the first user, a notification indicating that the credential of the second user has been validated.

In some implementations, the credential of the second user may be a first credential of the second user and the accessed credential information provided by the credential issuing organization may be first credential information. In these implementations, the method may include receiving, at the server system and from the device of the first user, a second request to validate a second credential of the second user. The second credential may be different than the first credential and may have been issued to the second user by the credential issuing organization. Also, in these implementations, the method may include identifying, by the server system, the second credential of the second user to validate based on the second request received from the device of the first user and confirming, at the server system, that the second credential of the second user corresponds to a credential issued to the second user by the credential issuing organization. Further, in these implementations, the method may include, based on confirmation that the second credential of the second user corresponds to a credential issued to the second user by the credential issuing organization, accessing, by the server system and for the second credential of the second user, second credential information provided by the credential issuing organization and validating, to the first user, the second credential of the second user based on the second credential information provided by the credential issuing organization.

In some examples, the credential of the second user may be a first credential of the second user, the credential issuing organization may be a first credential issuing organization, and the accessed credential information provided by the credential issuing organization may be first credential information. In these examples, the method may include receiving, at the server system and from the device of the first user, a second request to validate a second credential of the second user. The second credential may be different than the first credential and may have been issued to the second user by a second credential issuing organization that is different than the first credential issuing organization. Also, in these examples, the method may include identifying, by the server system, the second credential of the second user to validate based on the second request received from the device of the first user and confirming, at the server system, that the second credential of the second user corresponds to a credential issued to the second user by the second credential issuing organization. Further, in these examples, the method may include, based on confirmation that the second credential of the second user corresponds to a credential issued to the second user by the second credential issuing organization, accessing, by the server system and for the second credential of the second user, second credential information provided by the second credential issuing organization and validating, to the first user, the second credential of the second user based on the second credential information provided by the second credential issuing organization.

Other aspects include systems, apparatus, and computer-readable storage mediums configured to perform the operations of the method discussed above. The details of one or more implementations are set forth in the accompanying drawings and the description, below. Other potential features of the disclosure will be apparent from the description and drawings, and from the claims.

BRIEF DESCRIPTION OF THE DRAWINGS

FIG. 10 is a diagram illustrating an example data structure that stores credential data.

DETAILED DESCRIPTION

Techniques are described for managing credential information. The credential information may represent credentials that a user has been granted by one or more different credential granting authorities. For instance, the credentials may be licenses issued by government organizations (e.g., a license to practice medicine, a driver's license, a passport, a travel visa, etc.), degrees issued by institutes of learning (e.g., a collegiate degree issued by a university), a status denoting membership in a particular group (e.g., a badge of employment issued by a company, a gym membership, etc.), or any type of credential an organization or institute bestows on individuals. The credential information may be managed by a system operated by an entity that is separate from the credential granting authorities.

Figure 1:
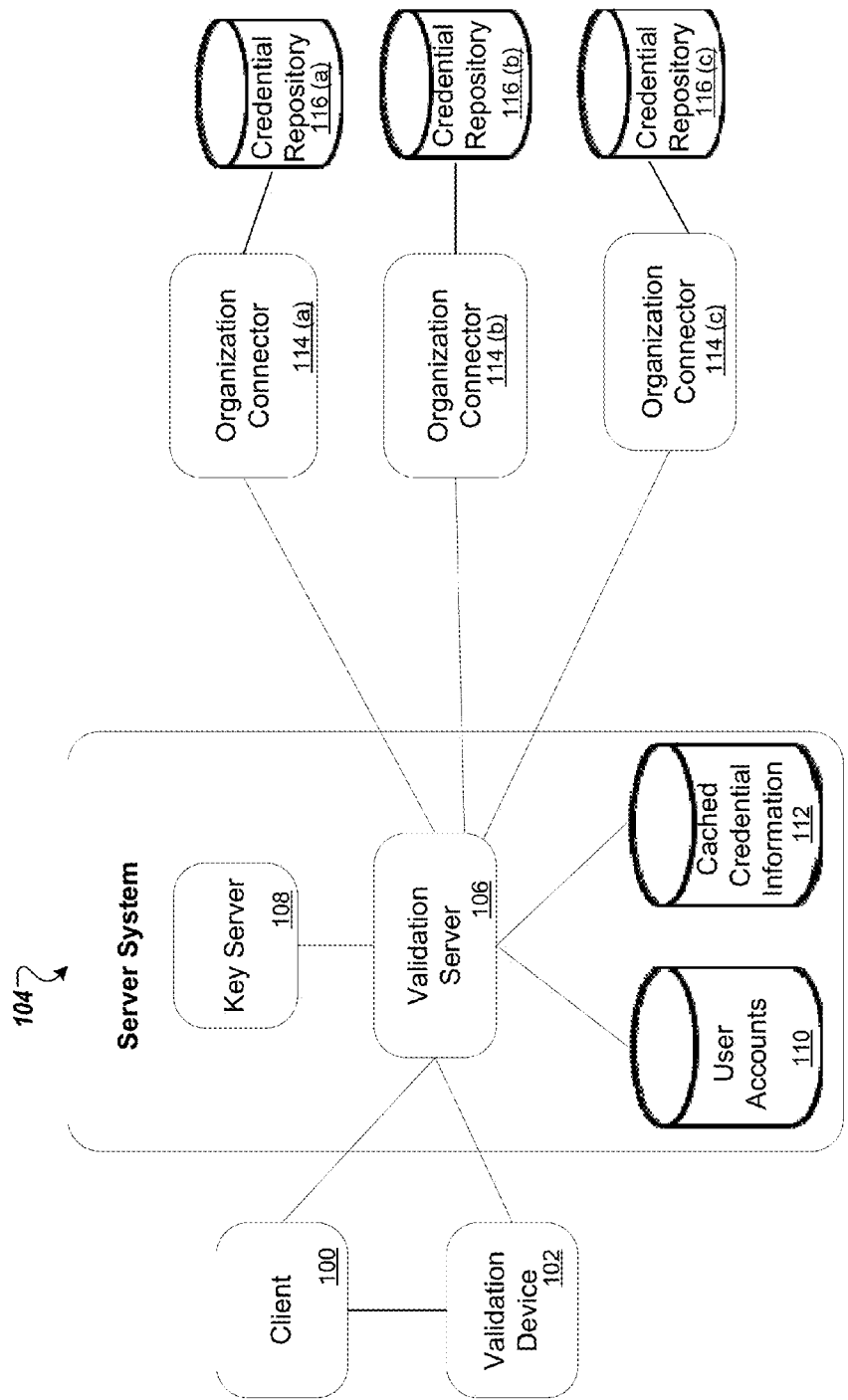
FIG. 1 is a diagram illustrating an example of a credential management system.

FIG. 1 illustrates an example of a credential managing system. As illustrated in FIG. 1, the system includes a client device 100, a validation device 102, and a server system 104. The client device 100 and the validation device 102 each operate a mobile device-based credential management application. The validation device is a client device that, for illustrative and exemplary purposes, is used to validate the credential of another user. The client device 100 and the validation device 102 may include any electronic device that is capable of communicating with the server system 104 including, but not limited to, a mobile phone, smart phone, personal digital assistant (PDA), electronic book (e-book) reader, tablet computer, laptop, or other device that includes one or more processors and non-transitory computer readable storage media. The credential management application is in communication with the server system 104. The credential management application acts as a platform for managing credentials issued to multiple, different users by various credential issuing organizations.

For example, as shown, the credential management application operated on the client device 100 may receive, from the server system 104, credential information for a first user that operates the client device 100. In this example, and as described in greater detail below, the credential management application operated on the client device 100 may provide credential information to the credential management application operated on the validation device 102 for proposes of verifying, to a second user who operates the validation device 102, that the first user holds one or more credentials represented by the credential information. In this example, the credential management application operated on the validation device 102 receives the credential information and communicates with the server system 104 to validate that the first user holds the one or more credentials represented by the credential information.

The server system 104 includes a validation server 106, a key server 108, an account data store 110, and a credential data store 112. The validation server 106 is involved in the process of validating credential issuing organizations as well as validation of credentials. The validation server 106 authenticates credential issuing organizations that would like to make credentials available to users of the credential management system. The validation server 106 also validates credentials held by users of the credential management system through communication with credential management applications operated on user devices.

The account data store 110 stores user account information and the credential data store 112 stores credential information associated with user accounts. Customers of the credential management application may set up a user account that allows the user to store personal information as well as the credentials issued to the user. Each user account may include identification information for the user and credential data that defines credentials held by the user. The system 104 may maintain accounts for multiple different users with each user account specific to a user and the credentials held by the specific user.

Credentials (or information related to credentials) issued to a user by a credential issuing organization may be cached in the credential data store 112 until a cache until date associated with the credential passes. The cache until date defines the date that a cached version of the credential may be used without having to communicate with the credential issuing organization to confirm the continued validity of the credential. When the cache until date has not passed, the server system 104 may access, from electronic storage at the server system 104, a cached version of the credential and use the cached version of the credential to send credential information (e.g., send a user an updated list of the user's credentials) or validate the credential (e.g., confirm to another user that the user's credential is valid). When the cache until date has passed, the server system 104 communicates with the credential issuing organization that issued the credential to receive updated credential information for the credential and then sends credential information or validates the credential based on the updated credential information. For example, an employer may define a cache until date of twenty-four hours for an employee credential issued to an employee by the employer. In this example, if the server system 104 has received information for the employee credential from the employer's system less than twenty-four hours prior to the employee's attempted use of the credential (e.g., presentation of the credential to gain access to the employer's building), the server system 104 may validate the use of the employee credential without having to communicate with the employer's system. If not, the server system 104 communicates with the employer's system to receive updated credential information for the employee credential and validates the use of the employee credential based on the updated credential information for the employee credential.

Credentials also may be associated with an expiration date. When a credential is associated with an expiration date, credential information for the credential may be stored by the server system 104 until the expiration date. For instance, when the server system 104 determines that the expiration date of a credential has passed, the server system 104 may delete the data defining the expired credential and remove the expired credential from the user's account.

The validation server 106 is in communication with the account data store 110 and the credential data store 112, for example, to manage and validate credentials. The validation server 106 authenticates and establishes connectors 114(a)-114(c) with various trusted credential issuing organizations 116(a)-116(c) as shown in FIG. 1. A connector 114 may include communication information that the server system 104 uses to communicate with a credential issuing organization 116. For instance, the communication information may include an electronic address (e.g., a uniform resource locator (URL)) that the server system 104 uses to communicate with the credential issuing organization 116 and a set of guidelines that govern a format for exchanging communications between the credential issuing organization 114 and the server system 104. The credential issuing organization 114 programs its system to follow the set of guidelines stipulated by the server system 104 to enable the two platforms to communicate credential information successfully. The set of guidelines stipulated by the server system 104 may be published to allow software developers and/or information technology staff to configure the systems at the credential issuing organizations 116 to comply with the set guidelines. A connector 114 may be established between the system of a credential issuing organization 116 and the server system 104 when the server system 104 stores the communication information and the system of the credential issuing organization 116 has been configured to communicate in accordance with the set of guidelines. In some implementations, the communication information defining the connector 116 may include communication information that enables the credential issuing organization 114 to communicate with the server system 104 through an Application Program Interface (API) of the server system 104. The server system 104 may store unique communication information for each credential issuing organization 116 and, thus, establish a unique connector 114 with each credential issuing organization 116. For the sake of brevity, the term connector 114 is used throughout this disclosure to refer to communication information used in exchanging communications with a credential issuing organization and does not necessarily connote a physical connection between the server system 104 and a system of the credential issuing organization 116, although a physical connection may be used in some implementations.

As shown in FIG. 1, the validation server 106 has established multiple, different connectors 114 (a)-(c) for multiple, different credential issuing organizations. The credential issuing organizations may include one or more universities, one or more companies, and one or more government agencies. Each credential issuing organization maintains a credential repository (e.g., credential repositories 116 (a)-(c)) on a system operated by the credential issuing organization. The systems operated by the credential issuing organizations use the connectors 114 (a)-(c) to communicate credential information from the credential repositories 116 (a)-(c) to the validation server 106. For instance, the client device 100 may wish to display a credential from the credential issuing organization associated with the connector 114 (a). The validation server 106 first identified the organization as authentic and established the connector 114 (a) between the server system 104 and the credential issuing organization. Using the connector 114 (a), the validation server 106 sends a request to the credential issuing organization for credential information of a user of the client device 100. The credential issuing organization accesses data from the credential repository 116 (a) and uses the connector 114 (a) to provide credential information from the accessed data to the validation server 106, which, in turn, provides credential information to the client device 100 for display through the credential management application. In some implementations, a credential issuing organization may provide several types of credentials to a user such that the user's account includes multiple, different credentials issued by the credential issuing organization to the user. Additionally or alternatively, a user may receive credentials from several different credential issuing organizations such that the user's account includes, at least a first credential issued by a first organization and a second credential issued by a second organization. The credential management system may maintain accounts for many different users, and may manage credentials issued to these users by many different organizations.

Figure 2:
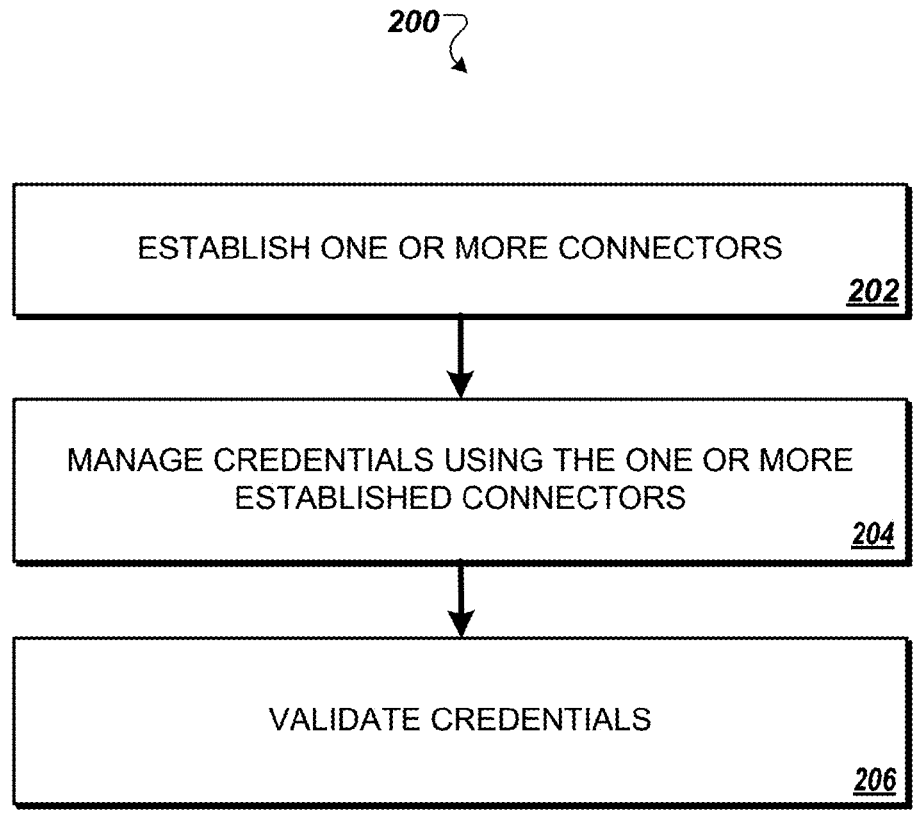
FIG. 2 is a flowchart illustrating an example process for managing and validating credentials.

FIG. 2 illustrates an example process 200 for managing and validating credentials. The operations of the process 200 are described generally as being performed by the server system 104. The operations of the process 200 may be performed by one of the components of the system 104 (e.g., the validation server 106) or may be performed by a combination of the components of the system 104. In some implementations, operations of the process 200 may be performed by one or more processors included in one or more electronic devices.

Figure 3:
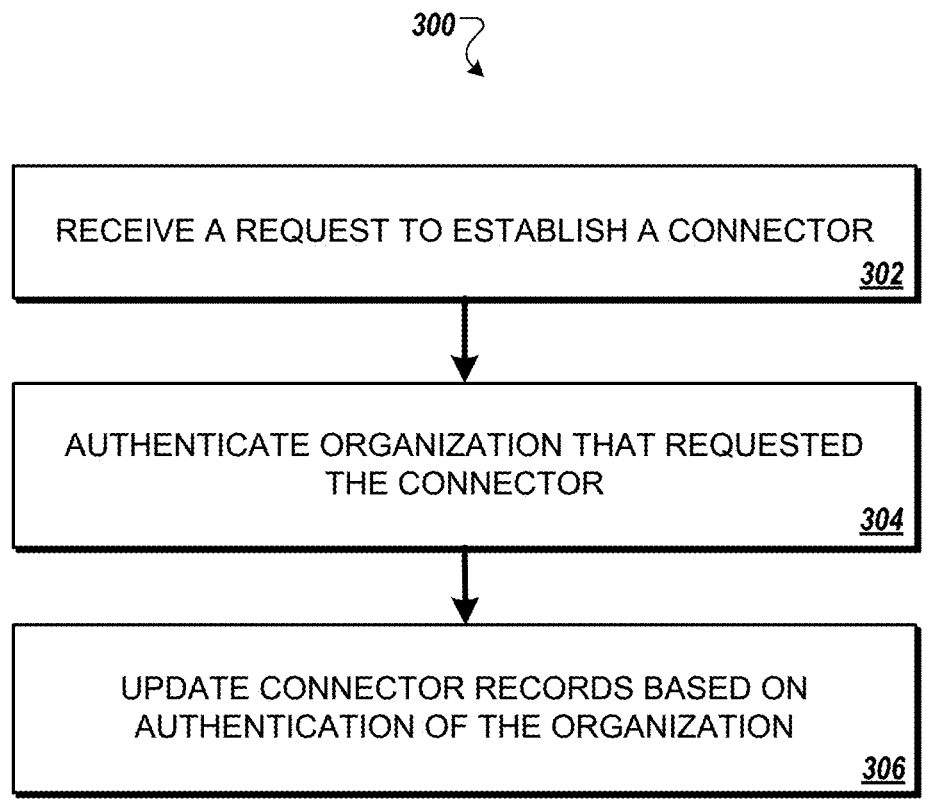
FIG. 3 is a flowchart illustrating an example process for establishing a connector with an organization.

The server system 104 establishes one or more connectors with credential issuing organizations (202). For example, the server system 104 may establish a connector between the backend system 104 and the credential issuing organization to ensure that the organization issuing credentials is trusted and that the credentials granted to a user are authentic. In some implementations, the server system 104 establishes a connector between a credential issuing organization and the server system 104 for a set period of time and renews the connector after the set period of time expires. In other implementations, the server system 104 establishes a connector between a credential issuing organization and the server system 104 for an unlimited time frame. server system FIG. 3 illustrates an example process 300 for establishing a connector with a credential issuing organization. The process 300 may be used in establishing one or more connectors with credential issuing organizations referenced above with respect to reference numeral 202. The operations of the process 300 are described generally as being performed by the server system 104. The operations of the process 300 may be performed by one of the components of the system 104 (e.g., the validation server 106) or may be performed by a combination of the components of the system 104. In some implementations, operations of the process 300 may be performed by one or more processors included in one or more electronic devices.

The server system 104 receives a request to establish a connector from a credential issuing organization (302). For example, the system 104 may receive a request from a University that wishes to allow alumni to display the degree(s) received from the institution as credentials on their mobile computing devices. The credential issuing organization, in this case, a University, may use its own organization computing system to operate a browser and navigate to a Uniform Resource Locator (URL) used for an administration portal site operated by the server system 104. The University then may use the organization computing system to request a connector at the administration portal site. Upon receiving the request, the server system 104 may establish a communication session with the organization computing system to enable exchange of communications used in establishing a connector. For instance, the server system 104 may establish a Secure Socket Layer (SSL) connection with the organization computing system.

Referring again to FIG. 3, the server system 104 authenticates the organization that requested to establish a connector (304). For example, the server system 104 retrieves, over the communication session established with the organization system, information that enables authentication of the organization system, such as a name of the organization and/or an administrator's email address for the organization. In implementations in which an SSL connection is established, the server system 104 receives a SSL certificate from the organization computing system over the SSL connection established. In such implementations, the server system 104 may extract the name of the credential issuing organization from data encoded on the SSL certificate. In addition, the server system 104 may store a trusted list of root saved certificates and, when the SSL certificate is received from the credential issuing organization and is signed with one of the certificates included in the trusted root saved list, the server system 104 may determine that the SSL certificate is authentic. For instance, in some implementations, the SSL certificate may be signed by a certificate authority (e.g., VeriSign) and the server system 104 confirms that the SSL certificate is authentic based on the signature of the certificate authority. The name of the organization may be retrieved through a secure format of the SSL certificate and, thus, may not be added by entry on a form or just provided to the server system 104. In some implementations, self-signed certificates may not be used since the originator may not be identified. In this regard, the system 104 may allow for only authentic connectors to be established.

In some examples, the server system 104 receives an administrator's email address for the credential issuing organization as part of the credential issuing organization's request to establish a connector with the server system 104. For instance, the server system 104 may receive the administrator's email address based on user input provided to an email address field displayed on a connector request web page generated by the server system 104. In examples in which the server system 104 receives the administrator's email address, the server system 104 may generate an email to the administrator's email address that includes a link to a log-in page and an authentication code which may be used to authenticate the credential issuing organization. An administrator at the credential issuing organization then causes the system at the credential issuing organization to navigate to the log-in page and provide the administrator's email address and the authentication code. The server system 104 validates the authentication code and establishes the connector when the authentication code provided is valid. The server system 104 may determine to establish a connector with the credential issuing organization when the organization is authenticated by the process described above.

Referring again to FIG. 3, the server system 104 updates connector records based on authentication of the credential issuing organization (306). For example, the server system 104 may add the newly established connector to a list of connectors established by the server system 104. In this example, the server system 104 maintains a list of the credential issuing organizations that have been authenticated and that have successfully established connectors with the server system 104. The list of established connectors may be stored as part of a directory of connectors and may associate each credential issuing organization with information that defines the connector established for the credential issuing organization. A connector record may store parameters for establishing, over an established connector, a communication session with a system operated by the credential issuing organization associated with the established connector. For example, a connector record may store one or more electronic addresses (e.g., URLs) for a system operated by the credential issuing organization associated with the established connector.

In some implementations, the server system 104 stores a directory of all credential issuing organizations that have established connectors with the server system 104. In these implementations, some of the credential issuing organizations may decide to make it public that the credential issuing organizations issue credentials through the server system 104, while other of the credential issuing organizations may decide to keep it private that the credential issuing organizations issue credentials through the server system 104. For the public credential issuing organizations, the server system 104 displays a list of all of the public credential issuing organizations to any user that requests to view a list of organizations that issue credentials through the server system 104. In contrast, the server system 104 may not include the private credential issuing organizations in the public directory of credential issuing organizations and/or the server system 104 may not display the private credential issuing organizations to any user that requests to view a list of organizations that issue credentials through the server system 104. Although the private credential issuing organizations may not be displayed publicly, a user with knowledge of a private credential issuing organization may add a credential from the private credential issuing organization by specifically identifying the private credential issuing organization to the server system 104 and requesting to add a credential from the private credential issuing organization.

Established connectors may be valid for a set period of time determined either by the server system 104 or the credential issuing organization. Alternatively, the established connector may be valid for an indefinite period.

Figure 4:
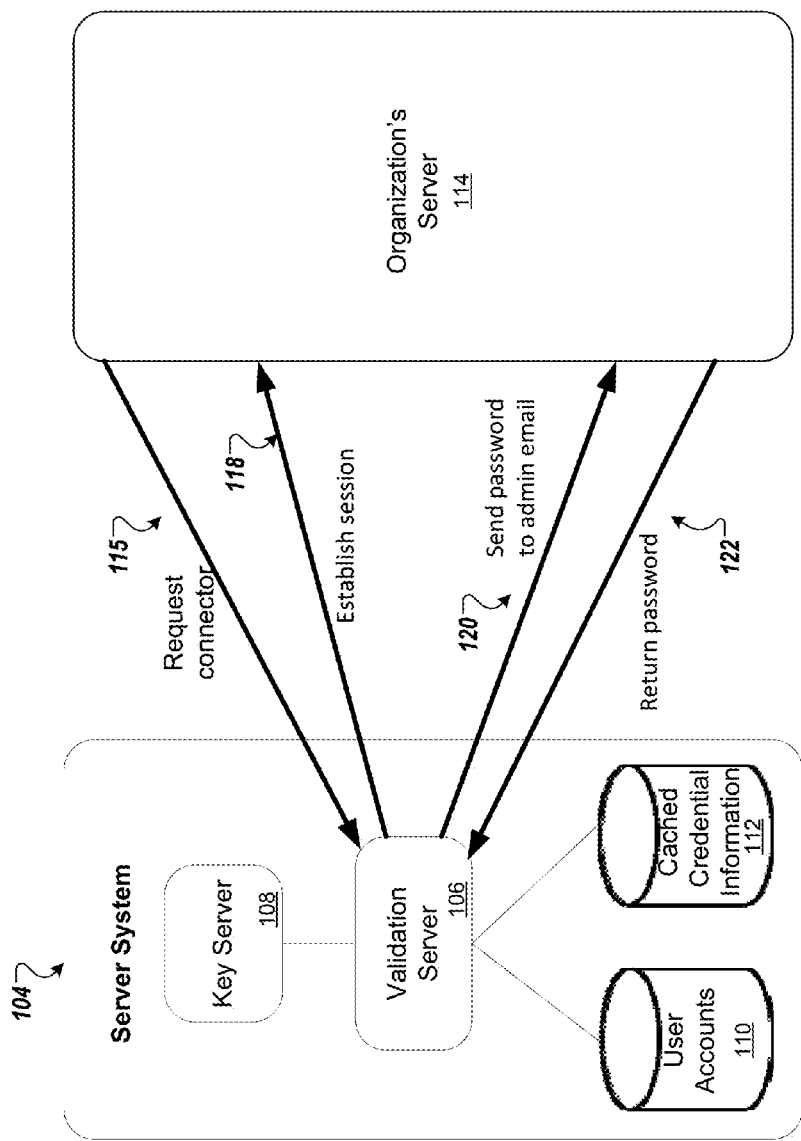
FIG. 4 is a diagram illustrating an example process for establishing a connector.

FIG. 4 illustrates an example process 400 for establishing a connector. The operations of process 400 may be used in aspects of the process 300 described above with respect to FIG. 3.

As shown, a credential issuing organization sends a request to the server system 104 for a connector to be established (115). In this example, an administrator from the credential issuing organization causes a system operated by the credential issuing organization to initiate the process of establishing a connector with the server system 104. The administrator from the credential issuing organization may navigate to an administrator portal site of the server system 104 and request a connector to the server system 104.

The validation server 106 of the server system 104 then establishes a communications session with the organization (118). Establishing a communications session between the server system 104 and the organization may involve the validating server 106 retrieving settings information from the organization and initiating a communications session with the organization. The server system 104 may establish an SSL connection with the organization and receive an SSL certificate from the credential issuing organization server over the secured connection. The settings information retrieved from the organization may include the administrative email address of the organization.

The validation server 106 at the server system 104 then generates an authentication email that includes an authentication code and a link to a log-in page at the server system 104. The validation server 106 sends the authentication email to the administrative email address retrieved from communications related to establishing the connector (120). The validation server 106 leaves the connector in a requested, but incomplete, state until the validation server 106 validates the authentication code sent in the authentication email. The organization's server 114 receives the email and an administrator at the organization controls the organization's server 114 to navigate to the log-in page using the link in the email and to provide the authentication code to the validation server 106 through an input field included in the log-in page (122). The validation server 106 validates the authentication code and confirms that the organization is authentic. Based on confirming that the organization is authentic, the validation server 106 establishes the connector between the validation server 106 and the credential issuing organization.

Referring again to FIG. 2, after establishing one or more connectors, the server system 104 manages credentials using the one or more established connectors (204). For example, the server system may receive one or more requests from one or more users to add credentials to their user accounts. A request to add one or more credentials issued by a credential issuing organization to a user account may include user authentication information (e.g., previously provided by the credential issuing organization), and the server system may communicate the authentication information received from the user to the credential issuing organization(s) in response to the request to add the one or more credentials to the user account. The credential issuing organization may verify the authentication information and provide the credential information associated with the requested credential to the server system through the established connector. In the case where an invalid request is received from a user, for example, if a credential has been revoked or has expired, the user's request to add the credential may be denied. After receiving the credential information, the server system may provide the credential information to the mobile credential management application at the user device for display.

In some examples, more than one credential may be added to a user account from one credential issuing organization. Additionally or alternatively, multiple credentials may be added to a user account from multiple different credential issuing organizations such that a user may receive a credential issued by a first organization and a second credential from a second organization. In some implementations, a credential issuing organization may provide credentials to multiple different user accounts. For example a company may provide employee badges to each of the employees at the company.

Figure 5:
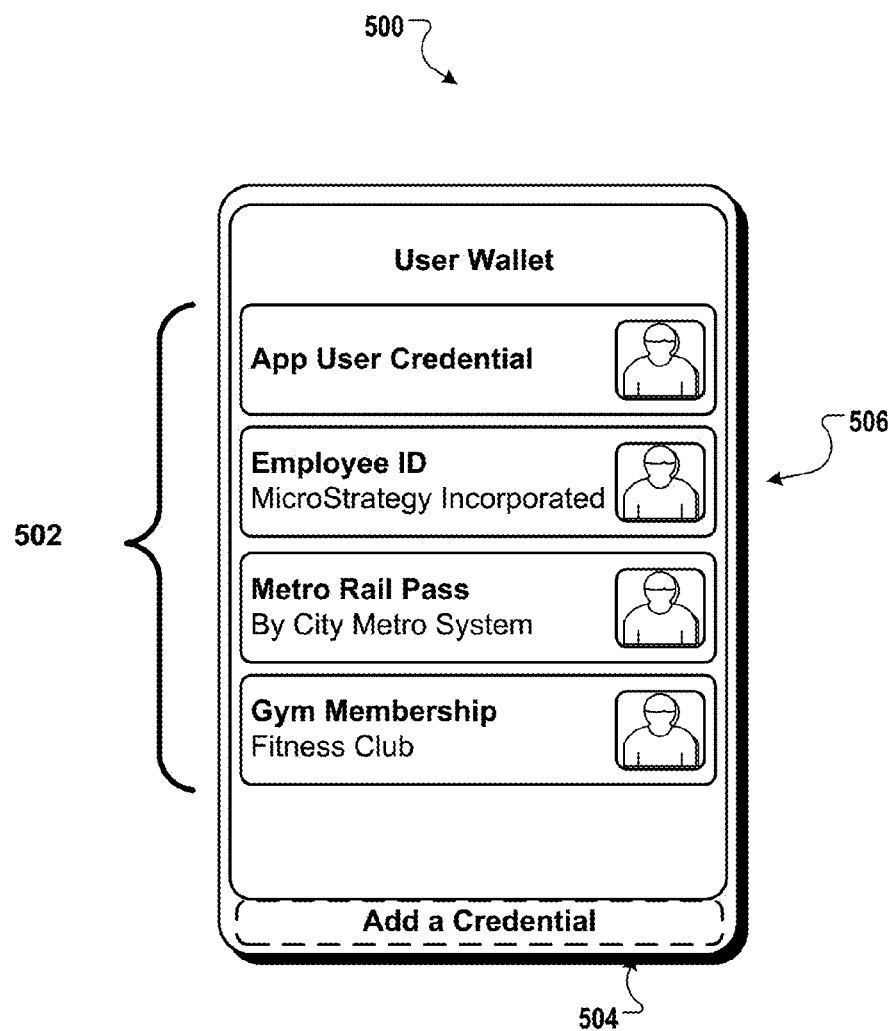
FIGS. 5-7 are diagrams illustrating example user interfaces for displaying credentials.
Figure 6:
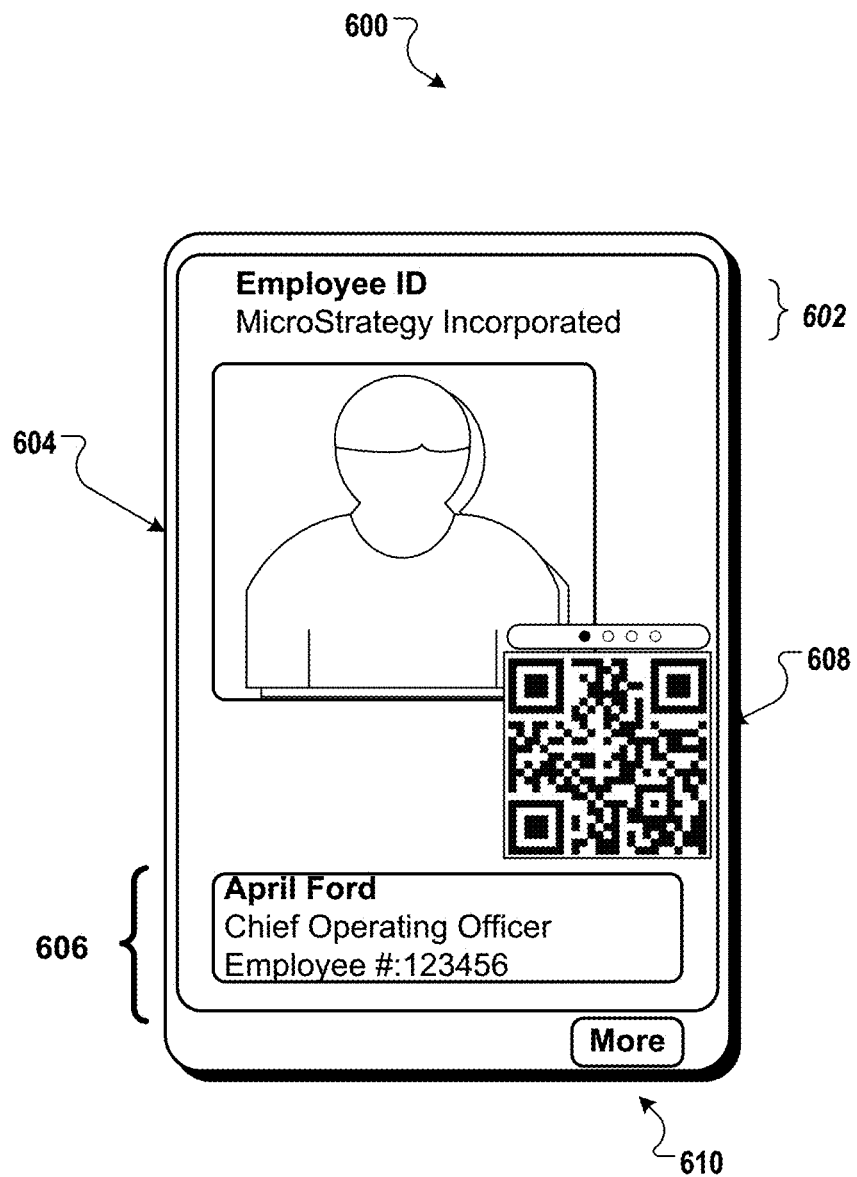
Figure 7:
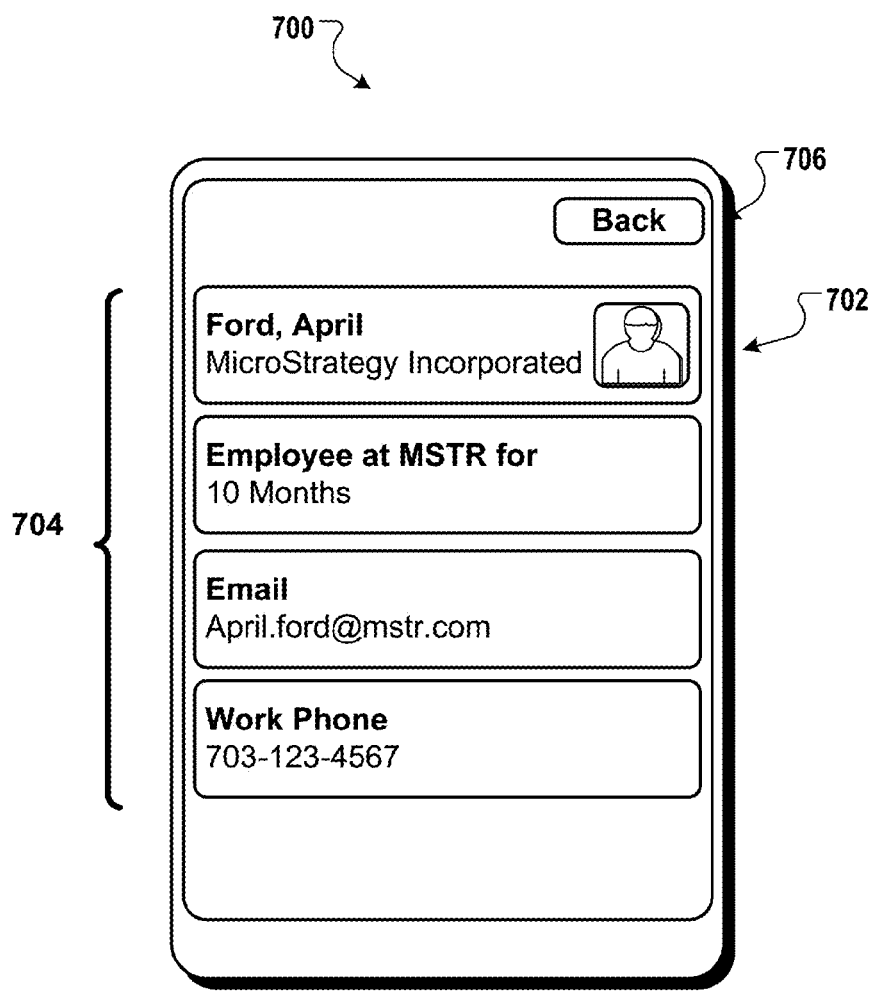

FIGS. 5-7 illustrate user interfaces for displaying credentials. The example user interfaces may be used in displaying credential information of a user. These interfaces may be displayed on a client device running the mobile credential management application. The interfaces represent the user account of a user running the credential management application on a client device and may include credentials issued by one or more credential issuing organizations.

For example, FIG. 5 illustrates an example user interface 500 that shows a list of the credentials held by a particular user. In this example, the user interface 500 shows four user credentials for the particular user account 502. The user may select the "Add a badge" tab to add new credentials to the user profile. The user also may select one of the credentials to view the credential. For instance, when the user selects the Employee ID 506, the credential is displayed on the user's mobile device as illustrated in FIG. 6.

FIG. 6 illustrates an example user interface 600 that displays a selected credential. The user interface 600 includes a description of the selected credential 602 and a picture 604 of the user that holds the credential. Also, the user interface 600 includes the personal information of the credential holder 606. In some implementations, some or all of the information displayed at the user interface may have been provided by the organization issuing the credential. The interface also includes a validation mechanism 608. The validation mechanism 608 may be used for validation of the credential by other users. In the example shown in FIG. 6, the validation mechanism is a Quick Reference (QR) code. Another user may use his or her device to image the QR code, extract credential information encoded within the QR code, and send the extracted credential information to the server system 104 for validation. As discussed in more detail below, in some implementations, as an alternative or in addition to a QR code, the validation mechanism 608 may be an alphanumeric code and/or the validation mechanism 608 may be an indication that credential information is available for transmission using ultrasonic communications, near field communications (NFC), and/or other short-wavelength radio transmissions (e.g., in the ISM band from 2400-2480 MHz), for example, according to the Bluetooth standard. The user interface 600 further includes a button 610 that causes additional information about the credential to be displayed. For instance, when the user selects the button 610, the user's mobile device displays the interface 700 illustrated in FIG. 7.

In some implementations, the user interface 600 represents a front of an employee badge and the interface 700 illustrated in FIG. 7 represents a back of the employee badge. In these implementations, when the user selects the button 610, an animation may occur that makes it appear as if the employee badge is being flipped from the front of the badge represented by the user interface 600 to the back of the badge represented by the interface 700 illustrated in FIG. 7.

FIG. 7 illustrates an example user interface 700 that displays additional information 702 and 704 about the credential. The top of the user interface 702 displays the name of the user and the name of the credential issuing organization for the particular credential. Additional information 704 includes the email address of the user, the length of time the user has held the credential, the location of the office, and the phone number of the user. Some or all of the information displayed about the credential may be provided by the organization issuing the credential. The user interface further includes a button 706 that causes the display to return to the front of the badge or the user interface illustrated in FIG. 6.

Figure 8:
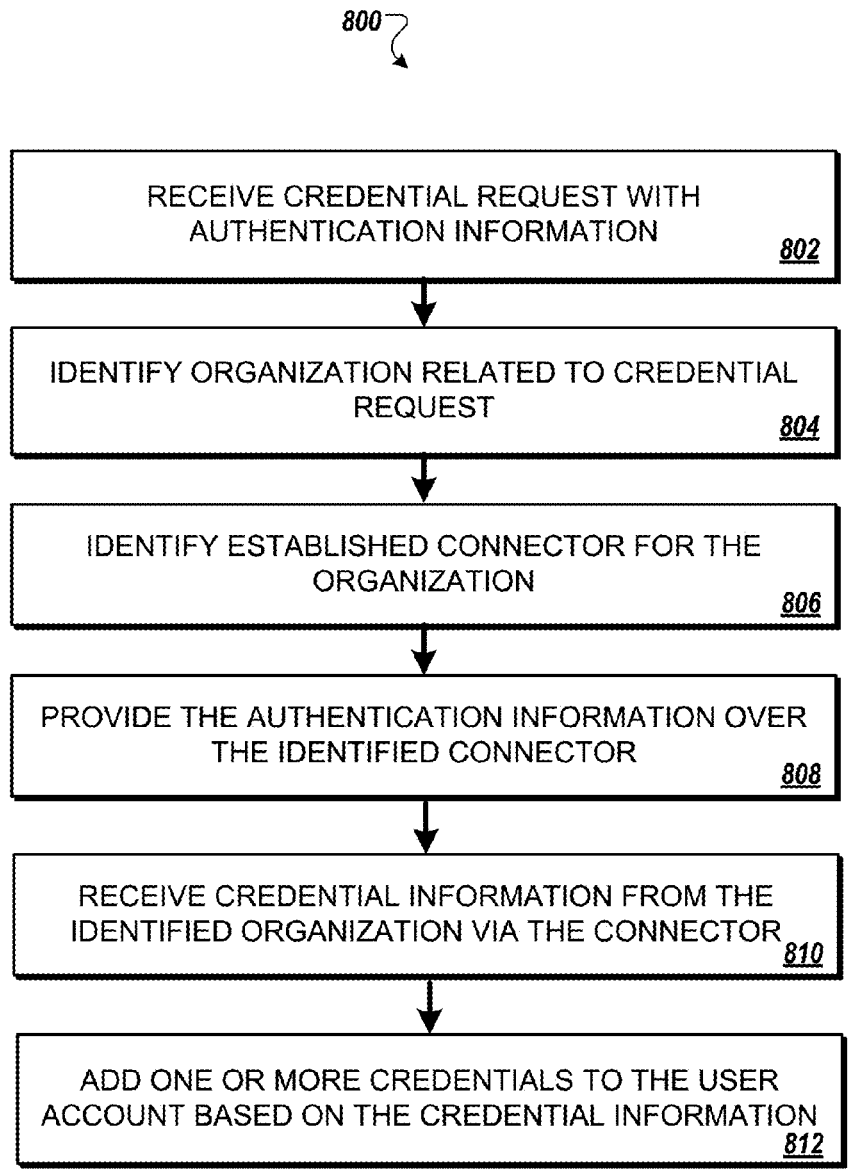
FIG. 8 is a flowchart illustrating an example process for adding a credential to a user's account.

FIG. 8 illustrates an example process 800 for adding a credential issued by a credential issuing organization with an established connector to a user's account. The operations of the process 800 are described generally as being performed by the server system 104. The operations of the process 800 may be performed by one of the components of the system 104 (e.g., the validation server 106) or may be performed by a combination of the components of the system 104. In some implementations, operations of the process 800 may be performed by one or more processors included in one or more electronic devices.

The server system 104 receives a credential request with authentication information (802). For example, the server system 104 may receive the request from a user device of a user wishing to add a credential. The device of the user may be equipped with the mobile credential management application that is in communication with the server system 104 over a network. For example, the user may wish to add a credential confirming that the user received a Master's degree issued from a University to his or her list of credentials. Continuing with this example, in some implementations, the user may select the University from the public directory that stores the list of all public credential issuing organizations that have established connectors with the server system 104 and indicate that the user desires to add a credential issued by the University.

In some implementations, a user may be able to add more than one credential issued by the same credential issuing organization. For instance, a user may wish to add both a first credential confirming that the user received a Bachelor's degree as well as a second credential confirming that the user received a Master's degree from the same University. The multiple credentials may be added in a single request or through a series of multiple, separate requests.

In some implementations, the user may wish to add a credential from a credential issuing organization that is private and, therefore, not listed in the public directory. In these implementations, the credential issuing organization may distribute a specific URL to users whom the credential issuing organization permits to add credentials from the credential issuing organization that the recipient users may use to initiate requests to add credentials from the credential issuing organization and to provide authentication information in connection with such requests.

The request to add a credential includes authentication information. In some implementations, the authentication information may be an access token provided to the user and/or the mobile application by the credential issuing organization. In these implementations, the server system 104 may receive, from the user, a request to add a credential from a credential issuing organization and, in response to the request, redirect the user to a server at the credential issuing organization that performs authentication for the credential issuing organization. The server at the credential issuing organization requests identification information from the user (e.g., a username and password) and authenticates the user based on the provided identification information. The server at the credential issuing organization then generates an access token for the user based on the user having authenticated himself or herself to the credential issuing organization, provides the access token to the user, and stores a copy of the access token in association with the user's account on the server at the credential issuing organization. The access token may be provided to the mobile application in a format specified by the server system 104 and may include and/or be encoded with an organization ID and identification information that the credential issuing organization subsequently may use to identify and/or authenticate the user. The user then provides the access token to the server system 104 as part of the request to add a credential issued by the credential issuing organization.

In some implementations, the authentication information in a request to add a credential may include a user name and password assigned to the user by the credential issuing organization. For example, where the user wishes to add a credential confirming that the user received a Master's degree from a University, the user may provide a student id number, a password and/or a year of graduation as authentication information. The authentication information included in the request for a credential is specified by the organization that issues the credential. The information required may be different depending on the credential issuing organization. The authentication information is confirmed by a server at the credential issuing organization by comparing the authentication information provided to the server at the credential issuing organization with authentication information for the user that was previously stored by the server at the credential issuing organization in association with an account of the user.

The server system 104 identifies the organization related to the credential request received from a user (804). For example, the server system 104 may identify the organization from an organization ID that is provided in the authentication information (e.g., an organization ID embedded or encoded in an access token) or in the request to add the token (e.g., an organization ID referenced by the URL through which the request is received in the case of a request to add a credential from a private credential issuing organization). The organization ID may be specific to the credential issuing organization that issued the credential to the user.

After identifying the organization related to the request, the server system 104 identifies the connector established for the identified organization (806). For example, the server system 104 may compare a received organization ID to a list of organization IDs and associated connectors and identify the connector associated with the organization ID based on the comparison. In some implementations, the client device stores a list of the connector ids for each credential issued to the user of the device. In these implementations, the client device identifies which connector should be used to communicate with the credential issuing organization and identifies the connector to the server system.

After identifying the connector established for the identified organization, the server system 104 provides the authentication information received in connection with the request to add the credential to the credential issuing organization over the identified connector (808). The authentication information may include any type of authentication information that enables the credential issuing organization to authenticate the user requesting to add the credential. For instance, as discussed above, the authentication information may be an access token the credential issuing organization provided to the user or the authentication information may be a user name and password that is recognizable by the credential issuing organization.

After the credential issuing organization receives the authentication information, the credential issuing organization uses the authentication information (e.g., username/password or the access token) received via the connector to authenticate the user and identify the credentials associated with the user. Based on determining that the authentication information is valid, the credential issuing organization retrieves credential information for the user from the credential repository at the credential issuing organization and transmits the retrieved credential information to the server system 104. Alternatively, based on determining that the authentication information is invalid, the credential issuing organization sends a return communication to the server system 104 over the connector indicating that the authentication information is invalid and/or that the user does not have any credentials issued by the credential issuing organization.

The server system 104 receives the credential information transmitted by the credential issuing organization via the established connector (810). The credential information may identify one or more credentials that are held by the user and that were issued by the credential issuing organization. In some implementations, the credential issuing organization may transmit the credential information to the server system 104 in a specific format specified by the server system 104. For example, the credential issuing organization may transmit the credential information to the server system 104 as a JavaScript Object Notation (JSON) object. Additionally or alternatively, the credential information may have certain fields to be filled by the credential issuing organization as specified by the server system 104. The fields may include group name, user name, title of credential or badge title, expiration date, cache until date, and an extra field. (See FIG. 10.) The credential information also may include additional information, the additional information may be communicated as key value pairs or it may be communicated as binary data or any other suitable data format. Additional information may include a photo of the user, or the logo of the credential issuing organization.

After receiving the credential information from the credential issuing organization, the server system 104 adds one or more credentials to the user's account based on the received credential information (812). For example, the server system 104 may identify an account associated with the user and associate, with the account, one or more credentials defined by the credential information. In this example, the server system 104 may store the credential information in association with the account of the user or the server system 104 may store other information representing the one or more credentials defined by the credential information.

In some examples, after a credential is added to a user's account, the server system 104 may sign the added credential and pass the added credential to the user device, where the added credential is displayed by the mobile credential management application with the list of credentials associated with the account of the user. In these examples, some or all of the credential information for each of the credentials associated with the account of the user is stored at the client device by the mobile credential management application. Accordingly, the mobile credential management application is able to display the list of credentials without communicating with the server system.

In some implementations, credential information is not stored at the client device and the user may be required to retrieve credentials from the credential issuing organization each time the user selects to view a list of credentials. In these implementations, the user may be required to go through the entire authentication process each time the user selects to view the list of his/her credentials.

In some examples, the server system 104 may store cached versions of the credentials and may retrieve credentials from storage to display when the user selects to view a list of credentials at the mobile credential management application. In these examples, the mobile credential management application communicates with the server system to display the list of credentials, but the user is not required to go through the entire authentication process to view the list of his/her credentials. Where a cached version of a credential is stored by the server system 104, the server system 104 may periodically request updated versions of the credential from the credential issuing organization to ensure that the version of the credential displayed by the user is the most current version and that the credential has not been revoked by the credential issuing organization.

Process 800 may be repeated to allow a user who may wish to add credentials from more than one credential issuing organization to his/her user account. For example, the user may wish to add a degree from a University, as well as an employee badge from his/her place of employment. In this example, the multiple credentials may be added in multiple, separate requests to add the credentials.

Figure 9:
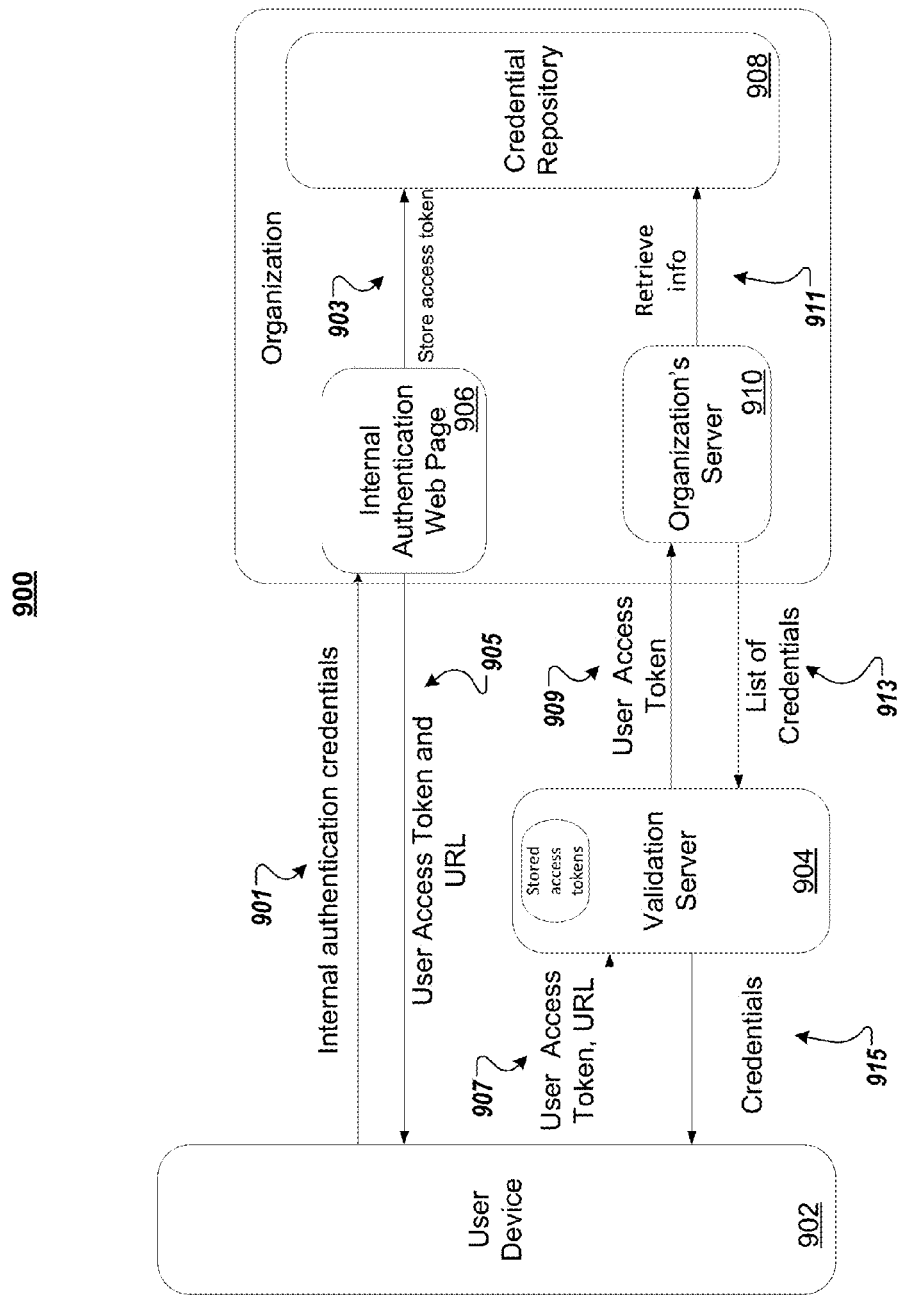
FIG. 9 is a diagram illustrating an example process for retrieving credentials and providing retrieved credentials to a user device.

FIG. 9 illustrates an example process 900 for adding a credential to a user's account and providing the credential to the user's user device. The operations of process 900 may be used in aspects of the process 800 described above with respect to FIG. 8.

As shown, a user desires to add a credential from an organization to the user's account. Initially, the user controls the user device 902 to access the mobile credential management application and selects the option to "Add a credential," as illustrated in FIG. 5. The user scrolls through the public directory to select the specific credential issuing organization that issued the credential he/she wishes to add. Upon selection of a credential issuing organization, the server system redirects the user's device to the credential issuing organization's Internal Authentication Interface 906 (e.g., an authentication webpage). The user provides internal authentication credentials to the Internal Authentication Webpage 906 (901). For instance, upon access, the Internal Authentication Interface 906 may prompt the user for a username and password, and the user device 902 may transmit a username and password to the Internal Authentication Interface 906 based on user input received at the user device 902.

The Internal Authentication Interface 906, at the credential issuing organization, authenticates the internal authentication credentials (e.g., username and password) provided by the user device 902. The information required for authentication by the credential issuing organization may be specific to the credential issuing organization. For an example in which a user desires to add a credential confirming that the user received a degree from a University, the University may require that the user provide a user name, date of birth, and graduation year as part of the authentication information. In a case in which the user desires to add an employee badge issued by an employer, the employer may require that the user provide a user name and employee id number as part of the authentication information. When the Internal Authentication Interface 906 validates the internal authentication credentials received, the Internal Authentication Interface 906 at the credential issuing organization generates a user access token and stores a copy of the user access token (e.g., in the credential repository 908 of the credential issuing organization) in association with credential information for the user (903). In addition, a copy of the user access token and the connector URL associated with the credential issuing organization are sent to the mobile credential management application on the user device 902 (905).

After receiving the user access token and the connector URL at the mobile credential management application, the user device 902 sends the user access token and the connector URL to the validation server 904 (907).

The validation server 904 receives the user access token with the connector URL. Using the provided connector URL, the validation server 904 provides the user access token to the identified organization's server (909). In some implementations, the validation server 904 also may store a copy of the user access token in association with the user's account, for example, to enable reuse of the user access token to subsequently refresh or update the user's credential information with the credential issuing organization.

The credential issuing organization receives the user access token over the connector 910 and uses the user access token to identify, from the credential repository 908, any credentials issued to the user (911). For instance, the credential issuing organization's system compares the received user access token to access tokens previously issued and stored for users to whom the credential issuing organization has issued credentials, and, based on the comparison revealing a match, the credential issuing organization's system accesses the credential information stored in the credential repository 908 in association with the matched access token. Alternatively, in the event that the comparison reveals that the received user access token does not match a stored user access token, the credential issuing organization may send an error message to the validation server 904 indicating that the user in not authentic and/or that the credential issuing organization has not issued any credentials to the user.

The list of one or more credentials and the corresponding credential information associated with the access token retrieved from the credential repository 908 is provided to the validation server 904 (913). The list of the one or more credentials and/or the credential information then may be provided to the mobile application at the user device 902 (915). The list of credentials associated with the user then may be displayed at the user device 902. In some implementations, copies of the credentials may be stored at the client device and credential information stored at the client device may be used to display a list of credentials in the mobile credential management application.

In some examples, the server system stores cached versions of the credentials and may retrieve credentials from storage to display when the user selects to view a list of credentials at the mobile credential management application.

In these examples, the mobile credential management application communicates with the server system to display the list of credentials. Where a cached version of a credential is stored by the server system 104, the server system 104 may periodically request updated versions of the credential from the credential issuing organization in an effort to ensure that the version of the credential displayed by the user is a current version and that the credential has not been revoked by the credential issuing organization.

In some implementations, the user must retrieve credentials from the credential issuing organization each time the user selects to view a list of his/her credentials. In such implementations, credential information may not be stored at the client device, and the user may be required to retrieve credentials from the credential issuing organization each time the user selects to view a list of credentials. The user may be required to go through the entire authentication process each time the user selects, at the mobile credential management application, to view the list of his/her credentials.

FIG. 10 illustrates an example data structure 1000 for storing credential information. The data structure 1000 may be used by the server system 104 to store credential information for each of the multiple, different users for which the server system 104 maintains credentials. The data in the data structure may be provided to the server system by the different credential issuing organizations.

The data structure 1000 includes a first column 1002 for the group name that uniquely identifies the credential issuing organization. For the example shown in FIG. 10, the credential issuing organizations include Armed Forces, City Metro System, and Stanford University. The second column 1004 includes the name of the user that holds the credential from the credential issuing organization listed in the first column 1002. A third column 1006 stores the title of the credential issued by the credential issuing organization listed in the first column 1002. A fourth column 1008 stores the expiration date of the issued credential. Once the expiration date has passed, the user needs to renew the credential for the credential to be valid. For example, a user may have subscribed to a gym membership for one year. After the membership expires at the end of the year, the user must renew the membership for the membership to be valid. The fifth column 1010 stores the cache until date of the issued credential. The cache until date defines how long a cached version of the credential may be used by the server system 104 without having to refresh the credential with the organization that issued the credential. For credentials that are generally valid for an extended period of time, a version can be cached. For example, a degree, granted by a University, is rarely revoked, and can therefore be stored at the server system for extended periods without checking the credential issuing organization for updates. For credentials that have a higher rate of change, such as a gym membership or an employee badge, the server may check with the credential issuing organization more frequently to be certain that the credential information is up to date. The sixth column 1012 is an extra column to store any additional data for the issued credential that is specific to the organization that issued the credential. Additional data may include a photo of the user and a logo of the credential issuing organization.

Figure 11:
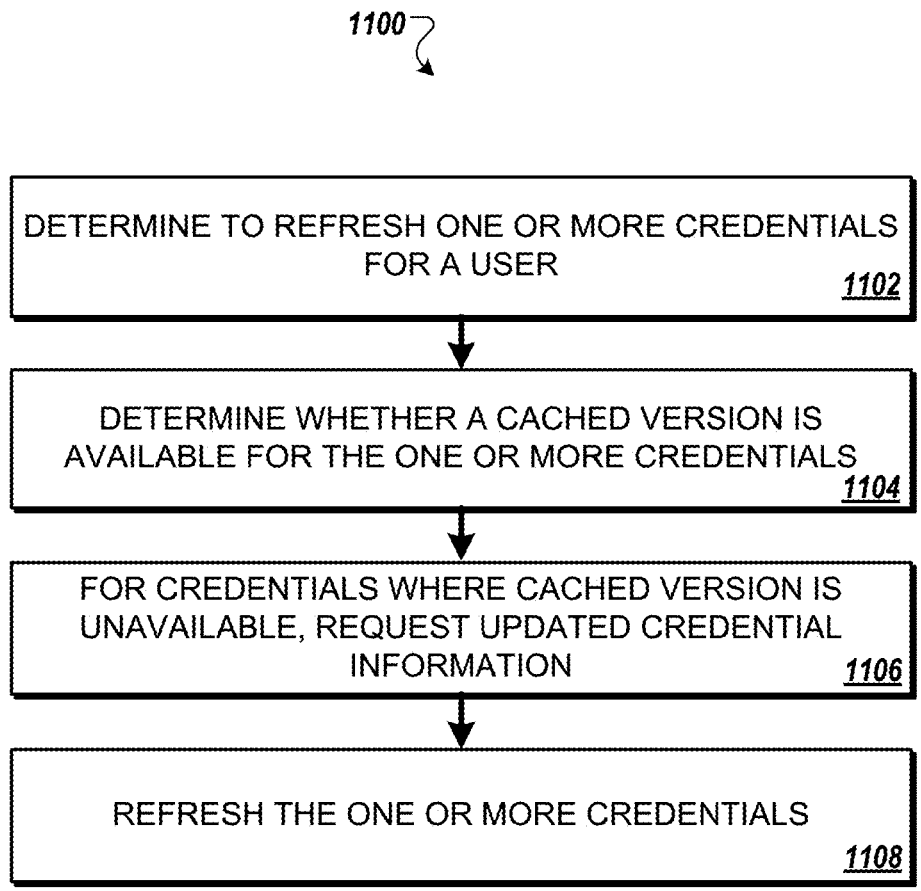
FIG. 11 is a flowchart illustrating an example process for refreshing credentials.

FIG. 11 illustrates an example process 1100 for refreshing cached credentials. The operations of the process 1100 are described generally as being performed by the server system 104. The operations of the process 1100 may be performed by one of the components of the system 104 (e.g., the validation server 106) or may be performed by a combination of the components of the system 104. In some implementations, operations of the process 1100 may be performed by one or more processors included in one or more electronic devices.

The server system 104 determines to refresh one or more credentials for a user (1102). The server system 104 refreshes a credential in an effort to have an up-to-date version of the credential available to the client device through the mobile credential management application. Refreshing a credential may include sending updated credential information to the client device, which the client device may display and/or store. A need to refresh one or more credentials may occur based on actions taken by the user through the mobile credential management application, such as providing input to display a current version of a particular credential or a current version of a list of credentials held by the user. Credentials stored on the client device also may be periodically refreshed (e.g., daily) by the server system 104 to ensure that the credential information stored on the client device is reasonably up-to-date.

There may be various different triggers that cause the server system 104 to determine to refresh one or more credentials. In some implementations, the system 104 may determine to refresh a credential based on a cache until date associated with the credential expiring. For example, an employee badge may have a cache until date of one week. At the end of the week, the system 104 may determine to refresh the badge to determine if a newer version of the badge is available. Additionally or alternatively, the system 104 periodically may determine to refresh a credential to ensure that the credential still is valid and has not been revoked by the credential issuing organization that issued the credential. The system 104 also may determine to refresh a credential in response to receiving a request to access the credential from the user to whom the credential was issued and/or in response to a request to validate the credential.

The server system 104 determines whether a cached version is available for the one or more credentials (1104). Cached credential information (112 of FIG. 1) may be stored at the server system 104. The credential information may be stored for a period of time indicated by the cache until date that is provided as one of the fields of the credential information. In some implementations, the server system 104 may determine if a cached version of a credential is available by verifying the cache until date in the credential information. In addition, the server system 104 may determine if a cached version of a credential is available by looking at the expiration date on the credential. The expiration date is provided to the server system 104 as one of the fields of the credential information. If the date is outside the expiration date of a credential, then the server system 104 recognizes that a cached version of the credential is not available, even if the cache until date remains valid.

The server system 104 requests updated credential information from the credential issuing organization if a cached version of the credential is not available (1106). For example, the server system 104 may store access tokens provided by a user when the user initially adds a credential to his or her user account. In this example, if a cached version of a credential is not available, the server system 104 accesses a stored version of the access token that was originally used to retrieve the credential and identifies the connector established for the organization that issued the credential. The server system 104 then provides the accessed access token to the credential issuing organization via the established connector. The credential issuing organization receives the access token and accesses, from the credential repository, credential information associated with the access token. The accessed credential information is provided to the server system 104 via the connector in the specified format, as described above. The credential information may have been updated since the last time the server system 104 received the credential information and the updated credential information is provided. In addition, if one or more credentials have been revoked by the credential issuing organization, the credential information would indicate the revocation of the one or more credentials. In this regard, the server system 104 is able to retrieve current credential information for the user without having to request new authentication information from the user.

The server system 104 refreshes the one or more credentials (1108). For instance, the server system 104 updates the user's account with the received credential information by replacing the previous credential information for the one or more credentials with the received credential information or by updating the previous credential information for the one or more credentials based on any differences included in the received credential information. The credential information received via the connector with the credential issuing organization also may be sent to the mobile application on the user device. As such, the user may be able to view a display of all the credentials associated with his/her user account including the credentials that were recently refreshed by the server system 104.

Referring again to FIG. 2, the server system 104 validates one or more credentials (206). For example, a first user may wish to validate one or more credentials of a second user. Multiple methods may be used to validate credentials of the credential management application. In some instances, the first user may determine the method of validation to be used to validate the credential of the second user. In some implementations, the first user may be able to validate a credential held by the second user issued by a particular credential issuing organization even if the second user does not hold a corresponding credential issued by the same credential issuing organization. Furthermore, in some implementations, a credential of any user of the credential management application may be validated by any other user of the credential management application.

Figure 12:
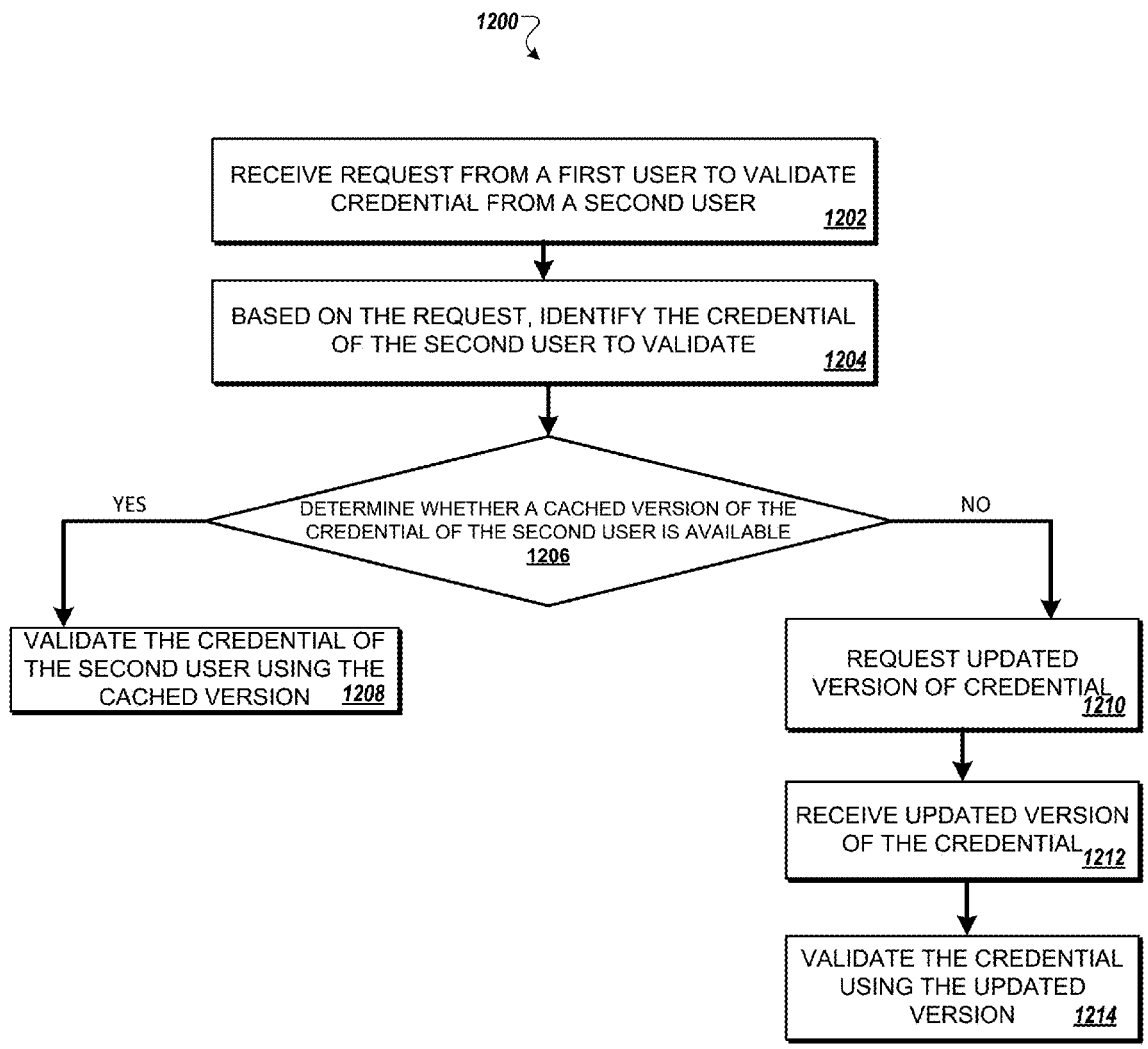
FIG. 12 is a flowchart illustrating an example process for validating credentials.

FIG. 12 illustrates an example process 1200 for validating credentials of users referenced above with respect to reference numeral 206. The operations of the process 1200 are described generally as being performed by the server system 104. The operations of the process 1200 may be performed by one of the components of the system 104 (e.g., the validation server 106) or may be performed by a combination of the components of the system 104. In some implementations, operations of the process 1200 may be performed by one or more processors included in one or more electronic devices.

The server system receives a request from a first user to validate a credential of a second user (1202). For example, a first user may wish to validate a second user who claims to be a police officer. In this example, the police officer, who has a police officer credential on his/her client device that was issued by a police department through the server system 104, may present, using the mobile credential management application, his or her police officer credential to the first user so the first user can validate the police officer's credential. The first user uses his or her user device to access credential information represented by the credential presented by the second user and sends the accessed credential information to the server system 104 as a request to validate the accessed credential information.

Figure 13:
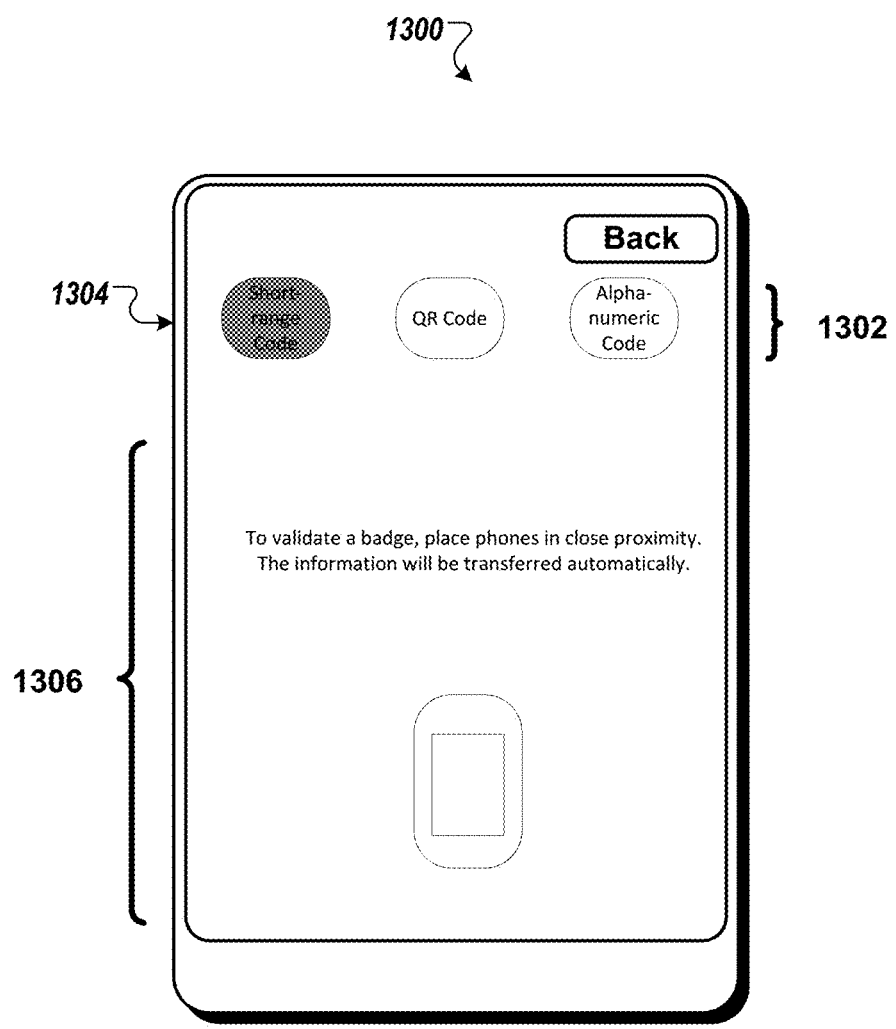
FIGS. 13-15 are diagrams illustrating example user interfaces for receiving credential information based on a presented credential.
Figure 14:
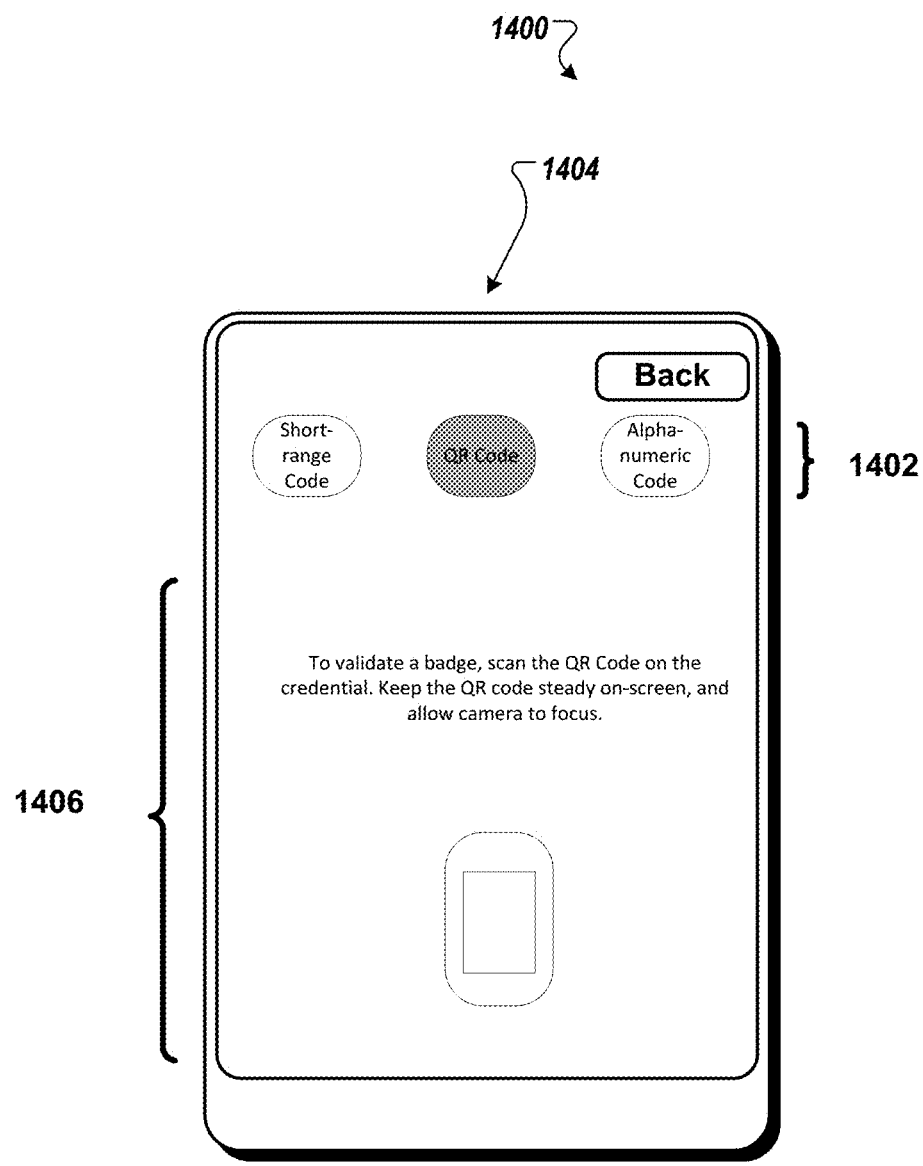
Figure 15:
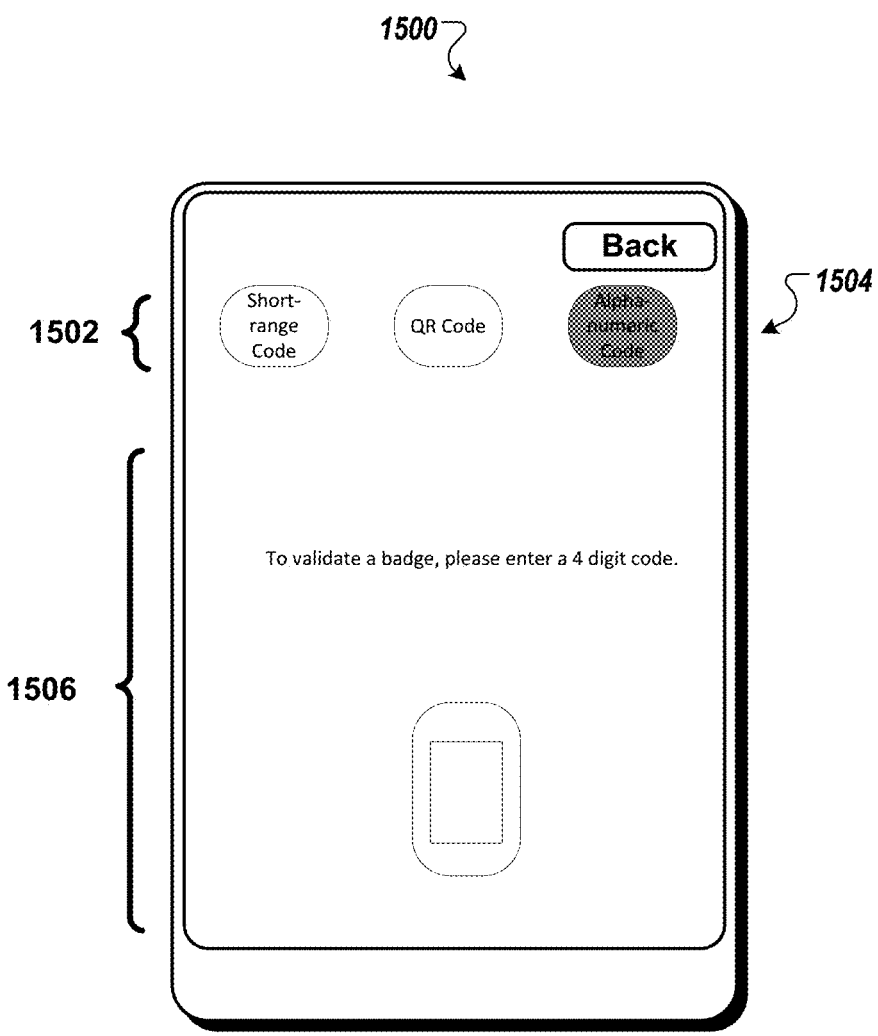

FIGS. 13-15 illustrate example interfaces for receiving credential information for a credential presented for validation. The example interfaces may be used in collecting the credential information used to generate the request to validate a credential discussed above with respect to reference numeral 1202. For instance, continuing with the example introduced above, one or more of the example interfaces of FIGS. 13-15 may be displayed by the user device of the first user to access credential information represented by the credential presented by the police officer.

FIG. 13 illustrates an example user interface 1300 for receiving credential information encoded within a short-range communication signal, such as, for example, an ultrasonic sound wave, an NFC signal, or a Bluetooth signal. In this example, the user interface 1300 includes an interface area 1302 that has three buttons. The three buttons enable selection of the available processes for receiving credential information that may be used in validating a credential. The processes include short-range code validation, QR code validation and alphanumeric code validation. For the example shown in FIG. 13, the short-range code button 1304 has been selected as the process for receiving credential information used in validating the credential.

To validate a credential using a code encoded within an ultrasonic sound signal, the user device receives a selection of the short-range code validation button 1304. Based on the selection of the short-range code button 1304, the user device displays an interface area 1306 that requests that the devices be held in close proximity to enable reception of a code encoded within an ultrasonic sound signal. In addition, the user device begins monitoring microphone input for an ultrasonic sound signal that carries the code. When another user has presented his or her credential for validation via an ultrasonic sound signal, the other user's device begins transmitting an ultrasonic signal from one or more loudspeakers that carries the code with credential information. When the other user's device is brought in close enough proximity to the user device displaying the interface 1300, the user device displaying the interface 1300 receives the ultrasonic signal, decodes the code from the ultrasonic signal, generates a request to validate the credential represented by the code, and sends the generated request to the server system 104 for validation. Short-range code validation also may be accomplished by encoding codes in other types of communication signals, such as, for example, Bluetooth and Near Field Communication (NFC) signals.

FIG. 14 illustrates an example user interface 1400 for receiving credential information encoded within a QR code. In this example, the user interface 1400 includes an interface area 1402 that has three buttons. The three buttons enable selection of the available processes for receiving credential information that may be used in validating a credential. The processes include short-range code validation, QR code validation and alphanumeric code validation. For the example shown in FIG. 14, the QR code button 1404 has been selected as the process for receiving credential information used in validating the credential.

To validate a credential using a QR code, the user device receives a selection of the QR code button 1404. Based on the selection of the QR code button 1404, the user device displays an interface area 1406 that includes output from a camera of the user device and asks the user to scan the QR code that represents the credential. The user device monitors the output from the camera in an attempt to detect a QR code brought into the view of the camera. When another user has presented his/her credential for QR code validation, the other user's device displays a QR code within which credential information representing the credential is embedded. The user device displaying the interface 1400 images the QR code displayed by the other user's device and extracts the credential information embedded with the QR code from the captured image of the QR code. The user device displaying the interface 1400 then generates a request to validate the credential represented by the QR code based on the extracted credential information and sends the generated request to the server system 104 for validation.

FIG. 15 illustrates an example user interface 1500 for receiving an alphanumeric code representing a credential to be validated. In this example, the user interface 1500 includes an interface area 1502 that has three buttons. The three buttons enable selection of the available processes for receiving credential information that may be used in validating a credential. The processes include short-range code validation, QR code validation and alphanumeric code validation. For the example shown in FIG. 15, the alphanumeric code button 1504 has been selected as the process for receiving credential information used in validating the credential.

To validate a credential using an alphanumeric code, the user device receives a selection of the alphanumeric code button 1504. Based on the selection of the alphanumeric code button 1504, the user device displays an interface area 1506 that includes input controls that enable a user to enter an alphanumeric code (e.g., a four digit alphanumeric code) and monitors for input entering the alphanumeric code. When another user has presented his or her credential for alphanumeric code validation, the other user's device requests, from the server system 104, an alphanumeric code that represents the credential being validated. The server system 104 generates an alphanumeric code and associates a timer with the generated alphanumeric code that defines how long the generated alphanumeric code is valid (e.g., one or two minutes). The server system 104 then sends the generated alphanumeric code to the other user's device, which receives and displays the generated alphanumeric code. One of the users then provides input to the user device displaying the interface 1500 entering the generated alphanumeric code displayed on the other user's device. The user device displaying the interface 1500 then generates a request to validate the credential represented by the generated alphanumeric code and sends the generated request to the server system 104 for validation.

Referring again to FIG. 12, based on the request received from the first user to validate a credential of the second user, the server system 104 identifies the credential of the second user to validate (1204). In identifying the credential of the second user to validate, the server system 104 confirms that the credential of the second user identifies an actual credential that has been issued through the server system 104 by a credential issuing organization.

In some implementations, a credential identifier (e.g., an alphanumeric string or a number) is included in the request and the server system 104 extracts the credential identifier to identify the credential of the second user to validate. For instance, the first user may use the mobile application on the user device to scan a QR code validation mechanism for the credential of the second user displayed on the second user's device. The mobile application, at the user device of the first user, decodes the credential identifier from the scanned QR code and communicates the credential identifier to the server system 104 as part of the request. The server system 104 then determines whether the credential identifier corresponds to an actual credential that has been issued through the server system 104 by a credential issuing organization.

Based on a determination that the credential identifier corresponds to an actual credential, the server system 104 may identify the credential associated with the credential identifier included in the request. Based on a determination that the credential identifier does not correspond to an actual credential, the server system 104 may send an error that rejects the request. In addition, the server system 104 also may confirm that the QR code is authentic, for example, based on other information included with the request that the mobile application at the user device of the first user decoded from the QR code. Based on a determination that the QR code is not authentic, the server system 104 may send an error that rejects the request.

Figure 16:
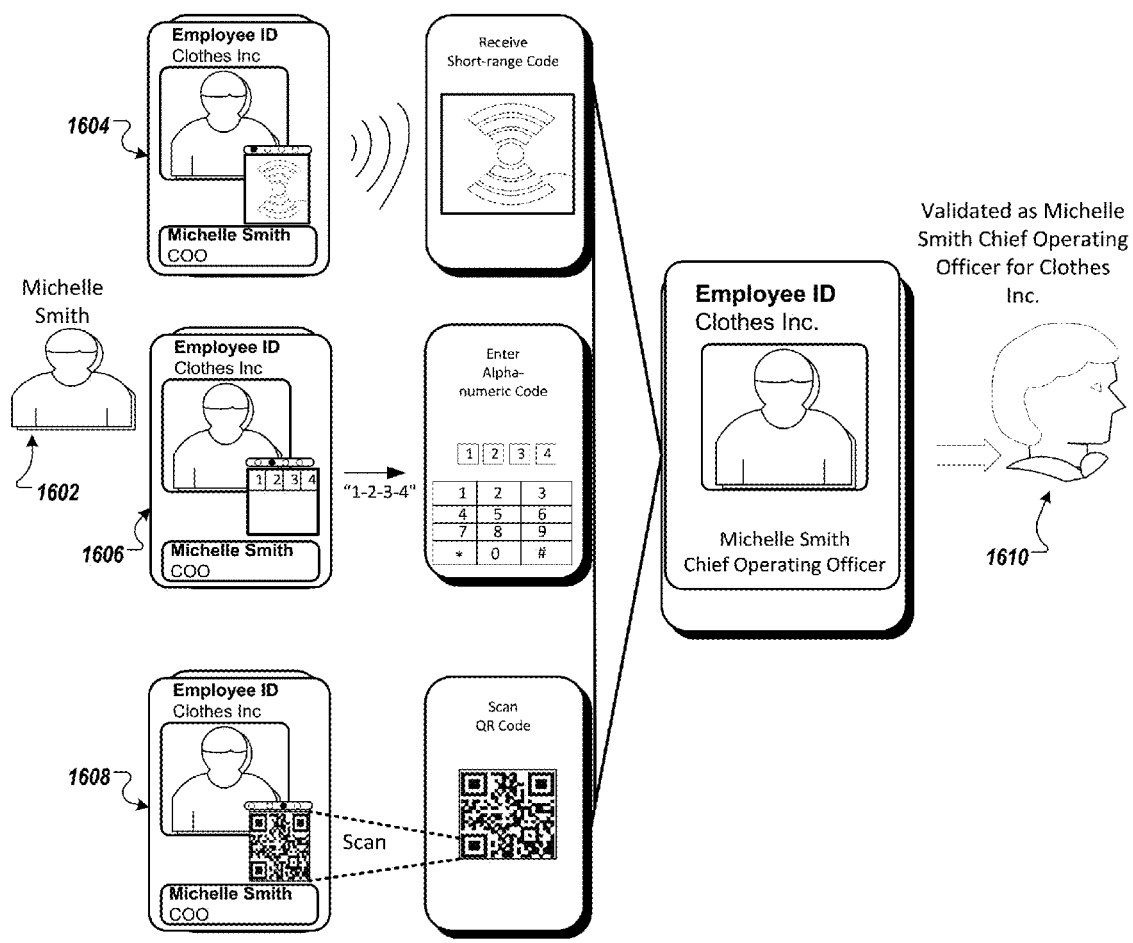
FIG. 16 is a diagram illustrating an example process for validating credentials.

When the first user requests to validate a credential based on an alphanumeric code representing the credential as described above in connection with FIG. 15 and illustrated in FIG. 16 at 1604, the request to validate the credential received by the server system 104 from the first user device may include the alphanumeric code representing the credential. The server system 104 extracts the alphanumeric code representing the credential from the request and attempts to identify the credential of the second user to be validated by comparing the received alphanumeric code to alphanumeric codes representing credentials that have been stored at the server system 104 in association with credentials. The server system 104 sends an error message to the first user's device based on a determination that the received alphanumeric code does not match any stored alpha numeric codes. Based on a determination that the received alphanumeric code matches a stored alpha numeric code, the server system 104 determines whether the request was received prior to expiration of the timer associated with the stored alpha numeric code. Based on a determination that the received alphanumeric code was received prior to the expiration of the timer, the server system 104 determines that the request corresponds to an actual credential that has been issued through the server system 104 by a credential issuing organization and identifies the credential associated with the alpha numeric code included in the request. Based on a determination that the received alphanumeric code was received after the expiration of the timer, the server system 104 may send an error that rejects the request.

Determining that the request corresponds to an actual credential that has been issued through the server system 104 by a credential issuing organization and identifying the credential may represent a first stage of validating a credential. After the first stage has been completed and the server system 104 has identified the credential as an actual credential, the server system 104 may perform a second stage of validating the credential that checks whether the previously issued credential remains valid.

For example, the server system 104 determines whether a cached version of the credential of the second user is available (1206). The server system 104 stores, in cached credential information, credentials issued to users in association with cache timing data defining how long the corresponding credential should be cached (e.g., a cache until date). The server system 104 is in communication with the cached credential information storage and determines whether a cached version of a credential is available by checking the cache timing data stored in association with the credential of the second user. In some implementations, the server system 104 determines that a cached version is available based on the current date being within the cache until date associated with the credential and determines that a cached version is unavailable based on the current date being outside of the cache until date associated with the credential. In some implementations, even if a cached version of the credential is available, the server system still communicates with the credential issuing organization that issued the credit to be validated, to ensure that the credential is valid.

To determine whether a cached version of the credential of the second user is available, the server system 104 accesses, from the cached credential information, a cached version of the credential of the second user and extracts cache timing data (e.g., a cache until date) associated with the cached version of the credential of the second user. The server system 104 then determines a time related to the request (e.g., a current time or the time the request was received) and compares the determined time to the cache timing data. The server system 104 determines that a cached version of the credential of the second user is available when the comparison reveals that the determined time is within the cache timing data. Similarly, and the server system 104 determines that a cached version of the credential of the second user is unavailable when the comparison reveals that the determined time is outside of the cache timing data. The server system 104 also may determine that a cached version of the credential of the second user is unavailable when the credential of the second user is not stored in the cached credential information.

Based on determining that a cached version of the credential is available, the server system 104 validates the credential of the second user using the cached version (1208). For example, the server system 104 may validate the identified credential using information stored at the server system 104 without communicating with the credential issuing organization that issued the credential. In this example, the server system 104 may communicate the cached version of the validated credential to the mobile application of the first user. The server system 104 may communicate the cached version of the validated credential with sufficient information to render a display of the validated credential by the mobile application of the first user. In some examples, all or some of the cached credential information for the validated credential is sent to the mobile device of the first user. In these examples, the credential information may be obtained from the cached version of the credential and may include a picture of the second user, the title of the credential, and expiration date of the credential. The first user may display the credential information through the mobile credential management application to the second user for visual verification purposes. In some implementations, the server system communicates with the credential issuing organization to confirm that the cached version of the credential is accurate prior to or concurrently with validating the credential using the cached version.

In some implementations, upon validation, the server system 104 sends, to the first user, a notification stating that the credential of the second user is valid and the first user's device receives the notification. In these implementations, the first user's device may display the notification with or without a display of the validated credential. In addition, the server system 104 also may send, to the second user, a notification stating that his or her credential has been validated. The notification may be sent in response to determining that a cached version of the credential is available without communicating with the credential issuing organization that issued the credential.

Based on determining that a cached version of the credential is unavailable, the server system 104 requests, from the credential issuing organization, an updated version of the credential (1210). For instance, the server system 104 communicates with the credential issuing organization that issued the credential to receive, from the credential issuing organization, current credential information for the credential. The current credential information may be the same as prior credential information or may be updated from the prior credential information, including an indication that the credential is no longer valid.

In some implementations, the server system 104 leverages previously-received authentication information to request current credential information from the credential issuing organization. For example, the server system 104 may store access tokens provided by a user when the user initially adds a credential to his or her user account. In this example, if a cached version of a credential is not available, the server system 104 accesses a stored version of the access token that was originally used to retrieve the credential and identifies the connector established for the organization that issued the credential. The server system 104 then provides the accessed access token to the credential issuing organization via the established connector. The credential issuing organization receives the access token and accesses, from the credential repository, credential information associated with the access token. The accessed credential information is provided to the server system 104 via the connector in the specified format. The credential information may have been updated since the last time the server system 104 received the credential information and the updated credential information is provided. In addition, if one or more credentials have been revoked by the credential issuing organization, the credential information would indicate the revocation of the one or more credentials. In this regard, the server system 104 is able to retrieve current credential information for the user without having request new authentication information from the user.

The server system 104 receives, from the credential issuing organization, an updated version of the credential of the second user (1212). For instance, the server system 104 receives the updated version of the credential from the credential issuing organization via the connector established between the credential issuing organization and the server system 104.

In implementations in which an access token is used to authenticate the owner of the credential, as mentioned above, the credential issuing organization retrieves the credential information associated with the access token and communicates the credential information to the server system 104. In some examples, the credential may no longer be valid and the credential issuing organization sends this information to the server system 104.

The server system 104 validates the credential of the second user using the updated version of the credential received (1214). For example, the server system 104 may validate the identified credential using current credential information received from the credential issuing organization. In this example, the server system 104 may communicate the current credential to the mobile application of the first user. The server system 104 may communicate the current credential with sufficient information to render a display of the current credential by the mobile application of the first user. In some examples, the credential includes a picture of the second user and the mobile application of the first user displays the picture for visual verification purposes.

In some implementations, upon validation based on the updated version of the credential received, the server system 104 sends, to the first user, a notification stating that the credential of the second user is valid and the first user's device receives the notification. In these implementations, the first user's device may display the notification with or without a display of the validated credential. In addition, the server system 104 also may send, to the second user, a notification stating that his/her credential has been validated.

FIG. 16 illustrates examples of processes 1600 for validating a credential of a user. For example, a first user 1602, Michelle Smith, presents a credential to a second user 1610. The second user 1610 then attempts to validate the credential presented by the first user 1602. As illustrated in FIG. 16, the credential may be validated using one of three example validation processes described above.

In a first example, the credential is validated using a code encoded within an ultrasonic sound signal 1604. In this example, the first user 1602 and the second user 1610 each select to validate the credential using a code encoded within an ultrasonic sound signal and bring their user devices into close proximity of each other. The user device of the first user 1602 transmits an ultrasonic sound signal encoded with credential information from one or more loudspeakers, and the user device of the second user 1610 receives the ultrasonic sound signal and decodes the credential information from the ultrasonic sound signal.

In a second example, the credential is validated using an alphanumeric code 1606. In this example, the first user 1602 and the second user 1610 each select to validate the credential using an alphanumeric code. The first user 1602 receives an alphanumeric code for the credential from the server system 104, and shares the code with the second user 1610. The second user 1610 enters the alphanumeric code into her user device.

In a third example, the credential of the first user 1602 is validated using a QR code 1608. In this example, the first user 1602 and the second user 1610 each select to validate the credential using a QR code. Consequently, the user device of the first user 1602 displays a QR code within which credential information is encoded, and the user device of the second user 1610 scans the QR code displayed in connection with the credential of the first user 1602. The user device of the second user 1610 then decodes the credential information from the scanned QR code.

In each of the three examples, once the credential information or alphanumeric has been received at the user device of the second user 1610, the user device of the second user 1610 sends, to the server system 104, a request to validate the credential based on the credential information or alphanumeric code. In response to the request, the user device of the second user 1610 receives one or more communications from the server system 104 indicating whether the credential is valid. In the event that the credential is determined to be valid, the server system 104 also may provide data associated with the validated credential to the user device of the second user 1610. In some implementations, this data associated with the validated credential may enable the user device of the second user 1610 to display a visual representation of the validated credential that is very similar to the credential displayed on the user device of the first user 1602. For example, the visual representation of the validated credential that is displayed on the user device of the second user 1610 may be the same as the visual representation of the credential displayed on the user device of the first user 1602 except it may not include the credential validation mechanism(s). Displaying such a visual representation of the validated credential on the user device of the second user 1610 may provide the second user 1610 with further confidence that the credential is valid. As shown in FIG. 16, the visual representation of the validated credential displayed on the user device of the second user 1610 enables the second user 1610 to confirm that the credential is valid and that the first user 1602 is indeed Michelle Smith, Chief Operating Officer for Clothes Inc.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer implemented method comprising:
   maintaining, at a server system, credential information for users including a first user and a second user;
   receiving, at the server system and from a device of the second user, a request for an alphanumeric code to use in validating a credential of the second user;
   generating, by the server system, an alphanumeric code associated with the credential of the second user to be validated;
   storing the generated alphanumeric code in association with timing data that defines how long the generated alphanumeric code is valid;
   sending, to the device of the second user, the generated alphanumeric code;
   receiving, at the server system and from a device of the first user, a request to validate a credential of the second user, wherein receiving the request to validate the credential comprises receiving, at the server system and from the device of the first user, an alphanumeric code based on user input;
   identifying, by the server system, the credential of the second user to validate based on the request received from the device of the first user;
   determining a match between the alphanumeric code received from the first user and the generated alphanumeric code and that reception of the received alphanumeric code accords with the timing data that defines how long the generated alphanumeric code is valid;
   based on the determination of the match between the alphanumeric code received from the first user and the generated alphanumeric code and that reception of the received alphanumeric code accords with the timing data that defines how long the generated alphanumeric code is valid, confirming, at the server system, that the credential of the second user corresponds to a credential issued to the second user by a credential issuing organization;
   based on confirmation that the credential of the second user corresponds to a credential issued to the second user by the credential issuing organization, accessing, by the server system and for the credential of the second user, credential information provided by the credential issuing organization; and
   validating, to the first user, the credential of the second user based on the accessed credential information provided by the credential issuing organization, wherein validating the credential of the second user comprises transmitting, to the device of the first user; an electronic notification that the credential of the second user is valid.

2. The method of claim 1:
   wherein accessing credential information provided by the credential issuing organization comprises:
      prior to the request to validate the credential of the second user:
         receiving, from the credential issuing organization, credential information that defines the credential of the second user, and
         caching, in electronic storage of the server system, the received credential information in association with cache until data that defines how long the cached credential information is valid;
      determining that, at the time of the request to validate the credential of the second user, the cached credential information is valid based on the cache until data; and
      accessing the cached credential information; and
   wherein validating, to the first user, the credential of the second user based on the accessed credential information provided by the credential issuing organization comprises validating, to the first user, the credential using the cached credential information and sending at least a portion of the cached credential information to the first user.

3. The method of claim 1:
   wherein accessing credential information provided by the credential issuing organization comprises:
      prior to the request to validate the credential of the second user:
         receiving, from the credential issuing organization, credential information that defines the credential of the second user, and
         caching, in electronic storage of the server system, the received credential information in association with cache until data that defines how long the cached credential information is valid;
      determining that, at the time of the request to validate the credential of the second user, the cached credential information is not valid based on the cache until data;
      based on the determination that the cached credential information is not valid, sending, to the credential issuing organization, a request for updated credential information for the credential of the second user; and
      receiving, from the credential issuing organization, updated credential information for the credential of the second user; and
   wherein validating, to the first user, the credential of the second user based on the accessed credential information provided by the credential issuing organization comprises validating, to the first user, the credential using the updated credential information received from the credential issuing organization and sending at least a portion of the updated credential information to the first user.

4. The method of claim 3:
   wherein sending, to the credential issuing organization, the request for updated credential information for the credential of the second user comprises:
      accessing, by the server system, a user access token associated with the credential of the second user, the user access token having been stored at the server system prior to the request to validate the credential of the second user based on the credential being added to an account of the second user; and
      providing, by the server system and using communication information established between the server system and the credential issuing organization, the accessed user access token, the accessed user access token being provided with the request for updated credential information and being used by the credential issuing organization to verify the request;

wherein receiving, from the credential issuing organization, updated credential information for the credential of the second user comprises receiving, from the credential issuing organization, updated credential information stored at the credential issuing organization in association with the user access token.

5. The method of claim 1:
wherein accessing credential information provided by the credential issuing organization comprises:
  accessing, by the server system, a user access token associated with the credential of the second user, the user access token having been stored at the server system prior to the request to validate the credential of the second user based on the credential being added to an account of the second user;
  sending, to the credential issuing organization, a request for updated credential information for the credential of the second user;
  providing, by the server system and using communication information established between the server system and the credential issuing organization, the accessed user access token with a request for updated credential information for the credential of the second user, the accessed user access token being used by the credential issuing organization to verify the request; and
  receiving, from the credential issuing organization, updated credential information for the credential of the second user, the updated credential information being stored at the credential issuing organization in association with the user access token; and
wherein validating, to the first user, the credential of the second user based on the accessed credential information provided by the credential issuing organization comprises validating, to the first user, the credential using the updated credential information received from the credential issuing organization and sending at least a portion of the updated credential information to the first user.

6. The method of claim 1:
wherein validating, to the first user, the credential of the second user comprises transmitting the accessed credential information to the device of the first user in a manner that enables the device of the first user to display the accessed credential information.

7. The method of claim 1, wherein the credential of the second user is a first credential of the second user and the accessed credential information provided by the credential issuing organization is first credential information, the method further comprising:
  receiving, at the server system and from the device of the first user, a second request to validate a second credential of the second user, the second credential being different than the first credential and having been issued to the second user by the credential issuing organization, wherein the second request to validate the second credential comprises receiving, at the server system and from the device of the first user, a second alphanumeric code based on user input;
  identifying, by the server system, the second credential of the second user to validate based on the second request received from the device of the first user;
  confirming, at the server system, based on determining a match between the second alphanumeric code received from the first user and the generated alphanumeric code and that reception of the received alphanumeric code accords with the timing data that defines how long the generated alphanumeric code is valid that the second credential of the second user corresponds to a credential issued to the second user by the credential issuing organization;
  based on confirmation that the second credential of the second user corresponds to a credential issued to the second user by the credential issuing organization, accessing, by the server system and for the second credential of the second user, second credential information provided by the credential issuing organization; and
  validating, to the first user, the second credential of the second user based on the second credential information provided by the credential issuing organization.

8. The method of claim 1, wherein:
the credential of the second user is a first credential of the second user;
the credential issuing organization is a first credential issuing organization;
the accessed credential information provided by the credential issuing organization is first credential information; and
the method further comprises:
  receiving, at the server system and from the device of the first user, a second request to validate a second credential of the second user, the second credential being different than the first credential and having been issued to the second user by a second credential issuing organization that is different than the first credential issuing organization;
  identifying, by the server system, the second credential of the second user to validate based on the second request received from the device of the first user;
  confirming, at the server system, that the second credential of the second user corresponds to a credential issued to the second user by the second credential issuing organization;
  based on confirmation that the second credential of the second user corresponds to a credential issued to the second user by the second credential issuing organization, accessing, by the server system and for the second credential of the second user, second credential information provided by the second credential issuing organization; and
  validating, to the first user, the second credential of the second user based on the second credential information provided by the second credential issuing organization.

9. The method of claim 1, further comprising maintaining, by the server system, accounts for multiple, different users with credentials issued by multiple, different organizations.

10. A system comprising:
at least one processor; and
at least one memory coupled to the at least one processor having stored thereon instructions which, when executed by the at least one processor, cause the at least one processor to perform operations comprising:
  maintaining, at a server system, credential information for users including a first user and a second user;
  receiving, at the server system and from a device of the second user, a request for an alphanumeric code to use in validating a credential of the second user;
  generating, by the server system, an alphanumeric code associated with the credential of the second user to be validated;

storing the generated alphanumeric code in association with timing data that defines how long the generated alphanumeric code is valid;

sending, to the device of the second user, the generated alphanumeric code;

receiving, at the server system and from a device of the first user, a request to validate a credential of the second user, wherein receiving the request to validate the credential comprises receiving, at the server system and from the device of the first user, an alphanumeric code based on user input;

identifying, by the server system, the credential of the second user to validate based on the request received from the device of the first user;

determining a match between the alphanumeric code received from the first user and the generated alphanumeric code and that reception of the received alphanumeric code accords with the timing data that defines how long the generated alphanumeric code is valid;

based on the determination of the match between the alphanumeric code received from the first user and the generated alphanumeric code and that reception of the received alphanumeric code accords with the timing data that defines how long the generated alphanumeric code is valid, confirming, at the server system, that the credential of the second user corresponds to a credential issued to the second user by a credential issuing organization;

based on confirmation that the credential of the second user corresponds to a credential issued to the second user by the credential issuing organization, accessing, by the server system and for the credential of the second user, credential information provided by the credential issuing organization; and validating, to the first user, the credential of the second user based on the accessed credential information provided by the credential issuing organization, wherein validating the credential of the second user comprises transmitting, to the device of the first user, an electronic notification that the credential of the second user is valid.

11. The system of claim 10:
wherein accessing credential information provided by the credential issuing organization comprises:
prior to the request to validate the credential of the second user:
receiving, from the credential issuing organization, credential information that defines the credential of the second user, and
caching, in electronic storage of the server system, the received credential information in association with cache until data that defines how long the cached credential information is valid;
determining that, at the time of the request to validate the credential of the second user, the cached credential information is valid based on the cache until data; and
accessing the cached credential information; and
wherein validating, to the first user, the credential of the second user based on the accessed credential information provided by the credential issuing organization comprises validating, to the first user, the credential using the cached credential information and sending at least a portion of the cached credential information to the first user.

12. The system of claim 11:
wherein accessing credential information provided by the credential issuing organization comprises:
prior to the request to validate the credential of the second user:
receiving, from the credential issuing organization, credential information that defines the credential of the second user, and
caching, in electronic storage of the server system, the received credential information in association with cache until data that defines how long the cached credential information is valid;
determining that, at the time of the request to validate the credential of the second user, the cached credential information is not valid based on the cache until data;
based on the determination that the cached credential information is not valid, sending, to the credential issuing organization, a request for updated credential information for the credential of the second user; and
receiving, from the credential issuing organization, updated credential information for the credential of the second user; and
wherein validating, to the first user, the credential of the second user based on the accessed credential information provided by the credential issuing organization comprises validating, to the first user, the credential using the updated credential information received from the credential issuing organization and sending at least a portion of the updated credential information to the first user.

13. The system of claim 12:
wherein sending, to the credential issuing organization, the request for updated credential information for the credential of the second user comprises:
accessing, by the server system, a user access token associated with the credential of the second user, the user access token having been stored at the server system prior to the request to validate the credential of the second user based on the credential being added to an account of the second user; and
providing, by the server system and using communication information established between the server system and the credential issuing organization, the accessed user access token, the accessed user access token being provided with the request for updated credential information and being used by the credential issuing organization to verify the request;
wherein receiving, from the credential issuing organization, updated credential information for the credential of the second user comprises receiving, from the credential issuing organization, updated credential information stored at the credential issuing organization in association with the user access token.

14. The system of claim 11:
wherein accessing credential information provided by the credential issuing organization comprises:
accessing, by the server system, a user access token associated with the credential of the second user, the user access token having been stored at the server system prior to the request to validate the credential of the second user based on the credential being added to an account of the second user;
sending, to the credential issuing organization, a request for updated credential information for the credential of the second user;
providing, by the server system and using communication information established between the server system and the credential issuing organization, the accessed user access token with a request for updated credential information for the credential of the second user, the accessed user access token being used by the credential issuing organization to verify the request; and receiving, from the credential issuing organization, updated credential information for the credential of the second user, the updated credential information being stored at the credential issuing organization in association with the user access token; and wherein validating, to the first user, the credential of the second user based on the accessed credential information provided by the credential issuing organization comprises validating, to the first user, the credential using the updated credential information received from the credential issuing organization and sending at least a portion of the updated credential information to the first user.

15. A non-transitory computer program product embodied in a computer readable medium storing instructions that, when executed, cause one or more computer processors to perform operations comprising:

maintaining, at a server system, credential information for users including a first user and a second user;

receiving, at the server system and from a device of the second user, a request for an alphanumeric code to use in validating a credential of the second user;

generating, by the server system, an alphanumeric code associated with the credential of the second user to be validated;

storing the generated alphanumeric code in association with timing data that defines how long the generated alphanumeric code is valid;

sending, to the device of the second user, the generated alphanumeric code;

receiving, at the server system and from a device of the first user, a request to validate a credential of the second user, wherein receiving the request to validate the credential comprises receiving, at the server system and from the device of the first user, an alphanumeric code based on user input;

identifying, by the server system, the credential of the second user to validate based on the request received from the device of the first user;

determining a match between the alphanumeric code received from the first user and the generated alphanumeric code and that reception of the received alphanumeric code accords with the timing data that defines how long the generated alphanumeric code is valid;

based on the determination of the match between the alphanumeric code received from the first user and the generated alphanumeric code and that reception of the received alphanumeric code accords with the timing data that defines how long the generated alphanumeric code is valid, confirming, at the server system, that the credential of the second user corresponds to a credential issued to the second user by a credential issuing organization;

based on confirmation that the credential of the second user corresponds to a credential issued to the second user by the credential issuing organization, accessing, by the server system and for the credential of the second user, credential information provided by the credential issuing organization; and validating, to the first user, the credential of the second user based on the accessed credential information provided by the credential issuing organization, wherein validating the credential of the second user comprises transmitting, to the device of the first user, an electronic notification that the credential of the second user is valid.

* * * * *